US012741365B2

(12) United States Patent
Zhu et al.

(10) Patent No.: US 12,741,365 B2
(45) Date of Patent: Sep. 22, 2026

(54) INTERACTION METHOD AND APPARATUS FOR MOBILE ROBOT, AND MOBILE ROBOT AND STORAGE MEDIUM

(71) Applicant: SHENZHEN PUDU TECHNOLOGY CO., LTD., Nanshan District (CN)

(72) Inventors: Junan Zhu, Shenzhen (CN); Tao Zhang, Shenzhen (CN); Cong Guo, Shenzhen (CN); Peng Chen, Shenzhen (CN); Xiang Wu, Shenzhen (CN); Fei Zeng, Shenzhen (CN); Junwei Chen, Shenzhen (CN)

(73) Assignee: SHENZHEN PUDU TECHNOLOGY CO., LTD., Shenzhen (CN)

( * ) Notice: Subject to any disclaimer, the term of this patent is extended or adjusted under 35 U.S.C. 154(b) by 196 days.

(21) Appl. No.: 18/575,668

(22) PCT Filed: Nov. 16, 2022

(86) PCT No.: PCT/CN2022/132312
§ 371 (c)(1),
(2) Date: Dec. 29, 2023

(87) PCT Pub. No.: WO2023/088316
PCT Pub. Date: May 25, 2023

(65) Prior Publication Data

US 2024/0308058 A1 Sep. 19, 2024

(30) Foreign Application Priority Data

Nov. 16, 2021 (CN) ......................... 202111354791.4
Nov. 16, 2021 (CN) ......................... 202111355659.5

(51) Int. Cl.
*B25J 5/00* (2006.01)
*G01S 17/89* (2020.01)
(Continued)

(52) U.S. Cl.
CPC ............... *B25J 5/007* (2013.01); *G01S 17/89* (2013.01); *G05D 1/242* (2024.01); *G05D 1/246* (2024.01)

(58) Field of Classification Search
CPC ........ B25J 5/007; B25J 13/089; B25J 19/021; B25J 19/027; G01S 17/89; G01S 15/931;
(Continued)

(56) References Cited

U.S. PATENT DOCUMENTS

2006/0041333 A1* 2/2006 Anezaki ................ G06V 20/64
2006/0187010 A1 8/2006 Berman
(Continued)

FOREIGN PATENT DOCUMENTS

CN 105976457 A 9/2016
CN 106406312 A 2/2017
(Continued)

OTHER PUBLICATIONS

Decision of Grant (with English translation) received in corresponding Application No. CN 202111354791.4, dated Dec. 1, 2023, 7 pages.

(Continued)

*Primary Examiner* — Ellis B. Ramirez
(74) *Attorney, Agent, or Firm* — OPENPTO US LLC; Yuhao Liang

(57) ABSTRACT

An interaction method for a mobile robot comprises: acquiring map data information of a space in which a mobile robot is located, and acquiring real-time environment perception data collected by an environment perception sensor, the real-time environment perception data comprising real-time obstacle information, and real-time indication information for indicating a road condition around the mobile robot; acquiring target traveling path information of the mobile robot on the basis of the real-time obstacle information and (Continued)

map data information of a space where the mobile robot is located and real-time environmental perception data collected by an environmental perception sensor are acquired — 101 target traveling path information of the mobile robot is acquired based on the real-time environmental perception data and the map data information, and a ground projection region is determined according to the target traveling path information and the real-time indication information — 102 to-be-projected pattern information is acquired, and projection parameters corresponding to the to-be-projected pattern is determined according to the to-be-projected pattern information and the ground projection region — 103 the laser projection device is controlled according to the projection parameters to project the to-be-projected pattern information onto the ground projection region — 104 the map data information, and determining a ground projection region according to the target traveling path information and the real-time indication information; acquiring a pattern to be projected, and determining a projection parameter corresponding to said pattern, wherein said pattern is used for indicating a traveling intention of the mobile robot; and controlling a projection apparatus according to the projection parameter, so as to project said pattern onto the ground projection region.

17 Claims, 14 Drawing Sheets

(51) Int. Cl.
*G05D 1/242* (2024.01)
*G05D 1/246* (2024.01)

(58) Field of Classification Search
CPC ........ G01S 17/86; G05D 1/242; G05D 1/246; G05D 2111/10; G05D 2111/30; G05D 1/243; G05D 2107/60; G05D 2109/10; B60Q 1/503; B60Q 1/5037; B60Q 1/525; H05B 45/10; H05B 45/20; H04N 9/3176
USPC ........... 700/245; 701/23, 301; 340/438, 469, 340/456, 461, 982, 985; 361/36; 901/1
See application file for complete search history.

(56) References Cited

U.S. PATENT DOCUMENTS

| | | | | |
|---|---|---|---|---|
| 2012/0025964 | A1 * | 2/2012 | Beggs | G08G 1/166 |
| 2012/0182155 | A1 * | 7/2012 | Sato | F16P 3/142 |
| 2014/0316570 | A1 | 10/2014 | Sun et al. | |
| 2015/0202770 | A1 | 7/2015 | Patron et al. | |
| 2016/0279793 | A1 * | 9/2016 | Sisbot | B25J 9/1674 |
| 2016/0337626 | A1 | 11/2016 | Mima | |
| 2019/0389368 | A1 * | 12/2019 | Yasuda | B60Q 1/50 |
| 2020/0039427 | A1 | 2/2020 | Chen et al. | |
| 2020/0174472 | A1 * | 6/2020 | Zhang | G06N 3/084 |
| 2020/0249684 | A1 * | 8/2020 | Onofrio | G08G 1/167 |
| 2022/0390251 | A1 * | 12/2022 | Suzuki | B60Q 1/34 |

FOREIGN PATENT DOCUMENTS

| | | | | |
|---|---|---|---|---|
| CN | 107139832 | A | 9/2017 | |
| CN | 108303972 | A | 7/2018 | |
| CN | 108326888 | A | 7/2018 | |
| CN | 108502044 | A | 9/2018 | |
| CN | 109491875 | A | 3/2019 | |
| CN | 109623778 | A | 4/2019 | |
| CN | 109927624 | A | 6/2019 | |
| CN | 110039535 | A | 7/2019 | |
| CN | 110442126 | A | 11/2019 | |
| CN | 210819621 | U | 6/2020 | |
| CN | 111481105 | A | 8/2020 | |
| CN | 114265397 | A | 4/2022 | |
| CN | 114274117 | A | 4/2022 | |
| DE | 10240227 | A | 3/2004 | |
| DE | 102006002960 | A1 * | 7/2007 | B66F 17/003 |
| DE | 102013215409 | A1 * | 2/2015 | G08B 5/36 |
| DE | 102015224309 | A1 * | 6/2017 | F16P 3/14 |
| EP | 3588228 | A | 1/2020 | |
| JP | 2010067466 | A | 3/2010 | |
| JP | 2018049438 | A | 3/2018 | |
| JP | 2020154635 | A | 9/2020 | |
| WO | WO-2009063318 | A1 * | 5/2009 | F16P 3/142 |
| WO | WO2018096208 | A1 | 5/2018 | |
| WO | WO 2020186493 | A1 | 9/2020 | |

OTHER PUBLICATIONS

Office Action (with English translation) received in corresponding Application No. CN 202111354791.4, dated Jun. 30, 2023, 24 pages.

International Search Report and Written Opinion (with English translation) received in corresponding Application No. PCT/CN2022/132312, dated Feb. 14, 2023, 17 pages.

Japanese Office Action (w/ English Translation) received in corresponding Application No. JP2024500596, dated Jan. 14, 2025, 10 pages.

Chinese Office Action for corresponding Application No. 202111355659.5, dated Feb. 18, 2024, 8 pages.

Extended European Search Report for corresponding Application No. 22894848.5, dated Sep. 18, 2024, 9 pages.

* cited by examiner for each pixel point in the to-be-projected pattern, a projection angle, projection time, and a projection color corresponding to each pixel point are determined according to the ground projection region — 501

↓ the projection angle, the projection time, and the projection color corresponding to each pixel point serve as the projection parameters of the laser projection device — 502

FIG. 8

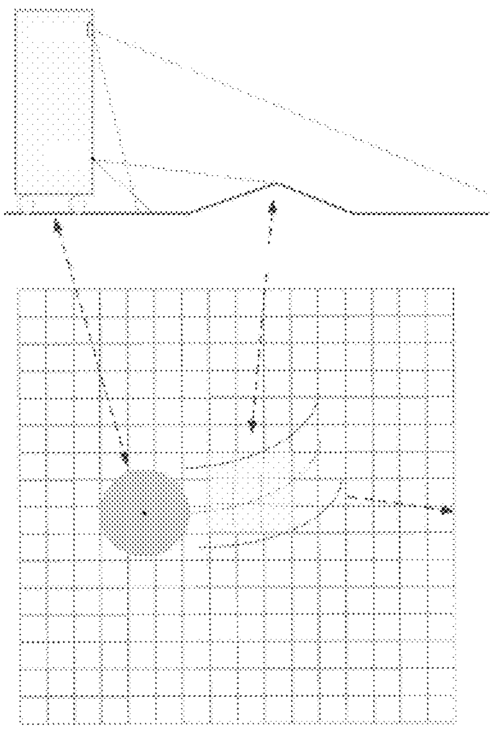

FIG. 9

INTERACTION METHOD AND APPARATUS FOR MOBILE ROBOT, AND MOBILE ROBOT AND STORAGE MEDIUM

CROSS REFERENCE TO RELATED APPLICATION

The present application is a US national stage application of PCT international application PCT/CN2022/132312, filed on Nov. 16, 2022, which claims priorities to the Chinese Patent Application No. 202111354791.4, filed on Nov. 16, 2021 and titled "Interaction Method and Apparatus for Mobile Robot, Mobile Robot and Storage Medium", and the Chinese Patent Application No. 202111355659.5, filed on Nov. 16, 2021 and titled "Robot, Obstacle-Based Robot Interaction Method and Apparatus, and Medium", the contents of which are expressly incorporated herein by reference in their entireties.

TECHNICAL FIELD

The present disclosure relates to the field of artificial intelligence, and particularly to an interaction method and apparatus for a mobile robot, a mobile robot and a storage medium.

BACKGROUND

Mobile robots are currently used in restaurants, shopping malls, hotels and other places with large flow of people. During the traveling intention process of the mobile robots, right-of-way conflicts with pedestrians often occur. In view of the above situation, it is necessary to provide an interactive method so that pedestrians can promptly understand the traveling intention of the mobile robots and take corresponding actions to resolve the right-of-way conflict.

In the traditional technology, the information interaction between mobile robots and pedestrians mainly includes voice and action forms. For example, the mobile robot receives instructions from people through a microphone, determines the prompt information corresponding to the instruction, and issues a prompt sound to the person through a speaker. The prompt sound is used for describing the information content of the prompt information to people; or by receiving action instructions, the indication information is transmitted by performing different mechanical actions. For example, voice broadcasting is usually adopted to implement the interaction between mobile robots and pedestrians, so that pedestrians can know the traveling intentions of the mobile robots. For example, when the mobile robot turns right, it may play the voice "I want to turn right, please pay attention" to inform the pedestrians.

In the traditional technology, prompt information is transmitted through prompt sounds or body actions. Since the prompt sound may be affected by various factors such as the distance between the person and the mobile robot, the surrounding environment sounds, language regionality, etc.; the prompt actions may also be affected by the distance between the person and the mobile robot. Especially in noisy places such as restaurants and shopping malls, the voice broadcasted by the mobile robot is difficult to be clearly transmitted to the pedestrians, and the interaction effect is dissatisfactory. Therefore, it may be difficult for the mobile robot to describe prompt information to people quickly and accurately, which may lead to lower interaction efficiency and lower interaction accuracy between the mobile robots and pedestrians.

SUMMARY

The present application provides an interaction method and apparatus for a mobile robot, a mobile robot, and a storage medium.

In the first aspect, an interaction method for a mobile robot is provided, the mobile robot is provided with a projection device and an environmental perception sensor, the method includes:

- acquiring map data information of a space where the mobile robot is located and real-time environmental perception data collected by the environmental perception sensor, wherein the real-time environmental perception data comprises real-time obstacle information and real-time indication information for indicating a road condition around the mobile robot;
- acquiring target traveling path information of the mobile robot based on the real-time obstacle information and the map data information, and determining a ground projection region according to the target traveling path information and the real-time indication information;
- acquiring a to-be-projected pattern, and determining a projection parameter corresponding to the to-be-projected pattern according to the to-be-projected pattern and the ground projection region, wherein the to-be-projected pattern is configured to indicate a traveling intention of the mobile robot;
- controlling the projection device according to the projection parameter to project the to-be-projected pattern onto the ground projection region.

In the second aspect, an interaction apparatus for a mobile robot is provided, the interaction apparatus includes:

- an acquisition module, configured to acquire map data information of a space where the mobile robot is located and real-time environmental perception data collected by the environmental perception sensor, wherein the real-time environmental perception data comprises real-time obstacle information and real-time indication information for indicating a road condition around the mobile robot;
- a path module, configured to acquire target traveling path information of the mobile robot based on the real-time obstacle information and the map data information, and determine a ground projection region according to the target traveling path information and the real-time indication information;
- a determination module, configured to acquire a to-be-projected pattern, and determine a projection parameter corresponding to the to-be-projected pattern according to the to-be-projected pattern and the ground projection region, wherein the to-be-projected pattern is configured to indicate a traveling intention of the mobile robot;
- a projection module, configured to control the projection device according to the projection parameter to project the to-be-projected pattern onto the ground projection region.

In the third aspect, a mobile robot is provided, including a projection device, an environmental perception sensor, and a processor;

- the environmental perception sensor is configured to collect real-time environmental perception data, the real-time environmental perception data comprises real-time obstacle information and real-time indication information for indicating a road condition around the mobile robot;

the processor is configured to acquire map data information of a space where the mobile robot is located and the real-time environmental perception data, acquire target traveling path information of the mobile robot based on the real-time obstacle information and the map data information, determine a ground projection region according to the target traveling path information and the real-time indication information, acquire a to-be-projected pattern, and determine a projection parameter corresponding to the to-be-projected pattern according to the to-be-projected pattern and the ground projection region, the to-be-projected pattern being configured to indicate a traveling intention of the mobile robot, and control the projection device according to the projection parameter to project the to-be-projected pattern onto the ground projection region;

the projection device is configured to project the to-be-projected pattern onto the ground projection region.

In the fourth aspect, a computer-readable storage medium is provided, on which a computer program is stored, the computer program, when executed by a processor, causes the processor to implement the interaction method for the mobile robot in the first aspect.

The details of one or more embodiments of the present disclosure are set forth in the accompanying drawings and the description below. Other features and advantages of the present application will be obvious from the description, drawings, and claims.

BRIEF DESCRIPTION OF THE DRAWINGS

In order to illustrate the technical solution of the embodiments of the present disclosure or the conventional technology more clearly, the accompanying drawings used in the description of the embodiments of the present disclosure or the conventional technology will be briefly introduced below. Obviously, the accompanying drawings in the following description are merely some embodiments of the present disclosure, and those skilled in the art can also obtain other drawings according to these drawings without any creative effort.

FIG. 8 is a flow chart of step 103 according to an embodiment of the present disclosure.

FIG. 9 is a schematic diagram of an operation of an RGBD sensor according to an embodiment of the present disclosure.

DETAILED DESCRIPTION

In order to facilitate understanding of the present application, the present application will be described more fully below with reference to the relevant accompanying drawings. Embodiments of the disclosure are given in the accompanying drawings. However, the present application may be implemented in many different forms and is not limited to the embodiments described herein. Rather, these embodiments are provided so that the content disclosed by the present application will be more thorough and complete.

Unless otherwise defined, all technical and scientific terms used herein have the same meaning as commonly understood by one of ordinary skill in the technical field to which this application belongs. The terms used in the description of the present application are merely for the purpose of describing specific embodiments and are not intended to limit the present application. As used in this specification, the term "and/or" includes any and all combinations of the associated listed items.

Figure 1:
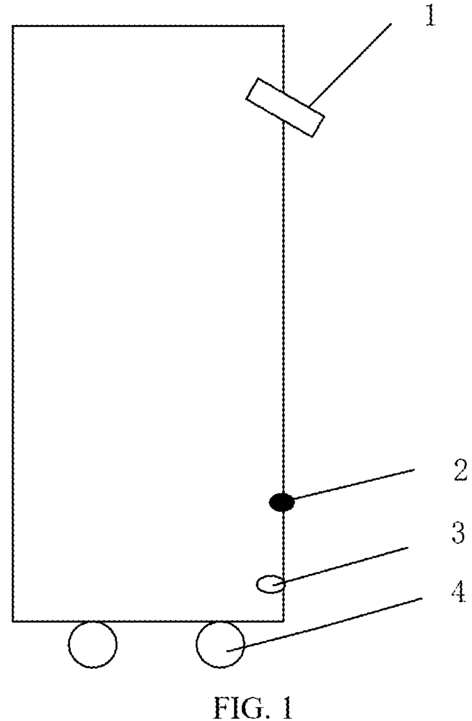
FIG. 1 is a schematic structure diagram of a mobile robot according to an embodiment of the present disclosure.

An execution body of an interaction method for a mobile robot provided by the embodiment of the present disclosure may be an interaction apparatus for the mobile robot. The interaction apparatus for the mobile robot is provided on the mobile robot as shown in FIG. 1, and may be implemented as part or all of a terminal of the mobile robot through software, hardware, or a combination of the software and hardware. The terminal may be a personal computer, a laptop, a media player, a smart television, a smartphone, a tablet, a portable wearable device, etc.

The mobile robot is provided with a plurality of environmental perception sensors, and a laser projection device. There may exist one, two or more environmental perception sensors. When there exists a plurality of environmental perception sensors, the arrangement of each environmental perception sensor is different. FIG. 1 exemplarily shows a mobile robot. As shown in FIG. 1, the plurality of environmental perception sensors may include an RGBD camera 1 and a radar device 3. A projection device 2 is provided above a traveling mechanism 4 of the mobile robot. The traveling mechanism 4 may include a wheel hub motor. It should be noted that the sensor types and installation positions of the environmental perception sensors can be adjusted according to the actual situations.

Figure 2:
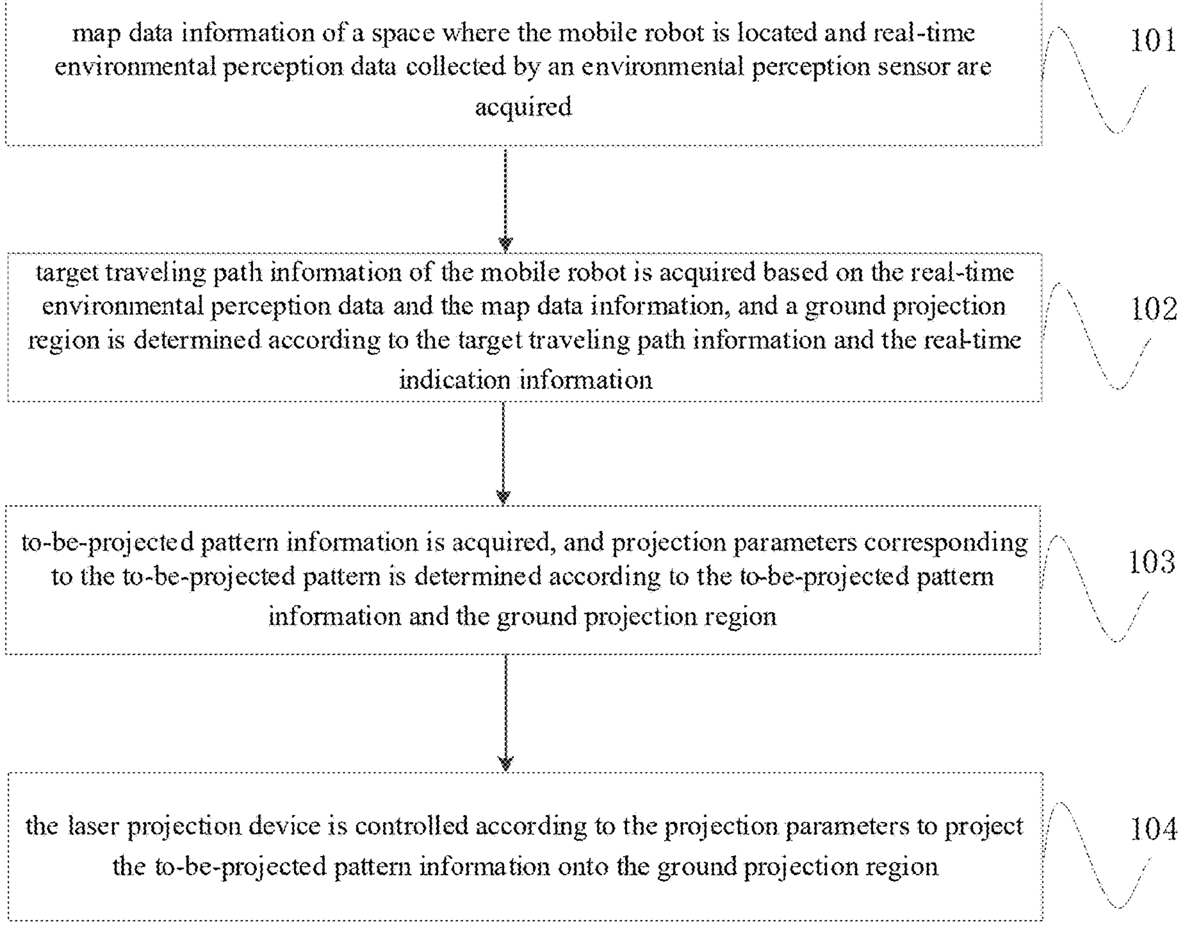
FIG. 2 is a flow chart showing an interaction method for a mobile robot according to an embodiment of the present disclosure.

Referring to FIG. 2, it shows a flow chart of an interaction method for a mobile robot provided by an embodiment of the present disclosure. In the embodiment, the method is applied to a terminal as an example for illustration. It can be appreciated that the method may also be applied to a system including a terminal and a server, and is implemented through the interaction between the terminal and the server. As shown in FIG. 2, the interaction method for the mobile robot may include the following steps.

Step 101: map data information of a space where the mobile robot is located and real-time environmental perception data collected by an environmental perception sensor are acquired.

The real-time environmental perception data may include real-time obstacle information and real-time indication information for indicating a road condition around the mobile robot. The obstacle may be summarized as two types: a stationary obstacle and a movable obstacle. Data of each type of obstacles is not limited. The real-time indication information for indicating the road condition around the mobile robot at least includes road surface shape information around the mobile robot and a distribution of obstacles on the road surface around the mobile robot.

In some embodiments, the environmental perception sensor may at least include an RGBD camera. The RGBD camera is configured to detect a distance between an obstacle around the mobile robot and the mobile robot, obstacle identification information, and the real-time indication information indicating the road condition around the mobile robot. The mobile robot may obtain real-time environmental perception data by processing a color image and a depth image collected by the RGBD camera.

In an optional implementation mode, the stored map data information is directly acquired from a preset storage region. The preset storage region may be in a server or in a terminal of the mobile robot. In another optional implementation mode, the map data information is constructed in real time by the mobile robot. During the movement of the mobile robot, the environmental perception sensor is utilized to collect data required for building the map, and the map is built and improved based on the collected data.

Step 102: target traveling path information of the mobile robot is acquired based on the real-time environmental perception data and the map data information, and a ground projection region is determined according to the target traveling path information and the real-time indication information.

In the restaurant or shopping mall environment, the static obstacle may be regarded as an object fixed in a position for a period of time, such as a table, a chair, a trash can, a cabinet, etc. In some embodiments, the map data information may include position information of static obstacles. Before the mobile robot starts traveling intention, the mobile robot may first acquire a starting position and an ending position, and then determine an initial traveling path from the starting position to the ending position based on the map data information. When the environmental perception sensor detects that there exits a movable obstacle (such as a pedestrian) around the mobile robot, the mobile robot may perform obstacle avoidance operations and change the traveling intention route of the mobile robot. That is, the target traveling path of the mobile robot is acquired based on the real-time environmental perception data and the map data information.

In some embodiments, the mobile robot uses a path planning algorithm to plan a path based on the acquired real-time environmental perception data and map data information, to obtain the target traveling path information. The path planning algorithm may include an incremental heuristic algorithm, a BUG algorithm, a graph search method, or a combination algorithm combining a plurality of path planning algorithms, etc.

In some embodiments, after obtaining the target traveling path information, the mobile robot determines a road region to be traveled through by the mobile robot in a future period as a ground projection region according to the target traveling path. A length of the future period may be determined according to a traveling speed of the mobile robot.

Figure 3:
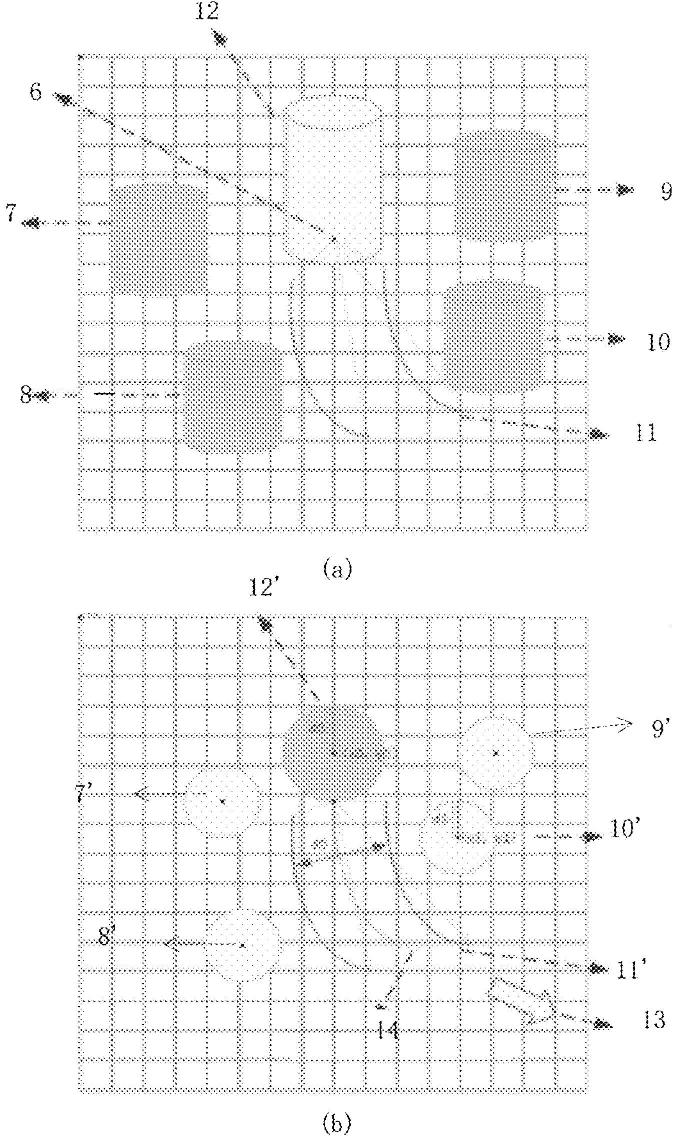
FIG. 3 is a schematic diagram of a projection region of a mobile robot according to an embodiment of the present disclosure.

As shown in FIG. 3, FIG. (a) is a three-dimensional schematic diagram of a space around the mobile robot, 6 denotes a projection light outlet of the projection device, 7 to 10 denote obstacles, 11 denotes a schematic diagram of a projection region, and 12 denotes the mobile robot. FIG. (b) is a ground distribution map corresponding to the FIG. (a), 7' to 10' denote contact surfaces between the obstacles 7 to 10 and the ground; 12' denotes a contact surface between the mobile robot 12 and the ground; and 13 denotes a target traveling intention direction of the mobile robot.

A coordinate point corresponding to a center position of the contact surface between the mobile robot 12 and the ground is determined as a coordinate position of the mobile robot, that is, $d_0(x_0, y_0)$ in FIG. (b). A series of moving coordinate points of the mobile robot in the future period is determined according to the target traveling path information. The series of moving coordinate points forms a center line, i.e., a curve 14 in FIG. (b). The center line is translated a certain distance to both sides to obtain two edge lines. A translation distance value is half a width value of a bottom surface of the mobile robot. A region between the two edge lines is the ground projection region, i.e., 11' in FIG. (b).

In some embodiments, a direction of the ground projection region is determined according to the target traveling path information; and a size and a shape of the ground projection region are determined according to the road surface shape information and the real-time obstacle distribution information. For example, when the road surface shape information indicates a curved shape, the ground projection region has a curved shape. When the real-time obstacle distribution information indicates that a free space in front of the real-time obstacle is relatively narrow, the ground projection region needs to be reduced.

Step 103: to-be-projected pattern information is acquired, and projection parameters corresponding to the to-be-projected pattern are determined according to the to-be-projected pattern information and the ground projection region.

The to-be-projected pattern information is configured to indicate a traveling intention of the mobile robot. The to-be-projected pattern may be a text pattern, a graphic pattern, or a combination of a text and a geometric figure, or an animation. The to-be-projected pattern information may be flashed and displayed on the ground.

In some embodiments, projection parameters may include a projection angle, a projection color, a projection content, projection time, and so on.

Step 104: the laser projection device is controlled according to the projection parameters to project the to-be-projected pattern information onto the ground projection region.

Figure 4:
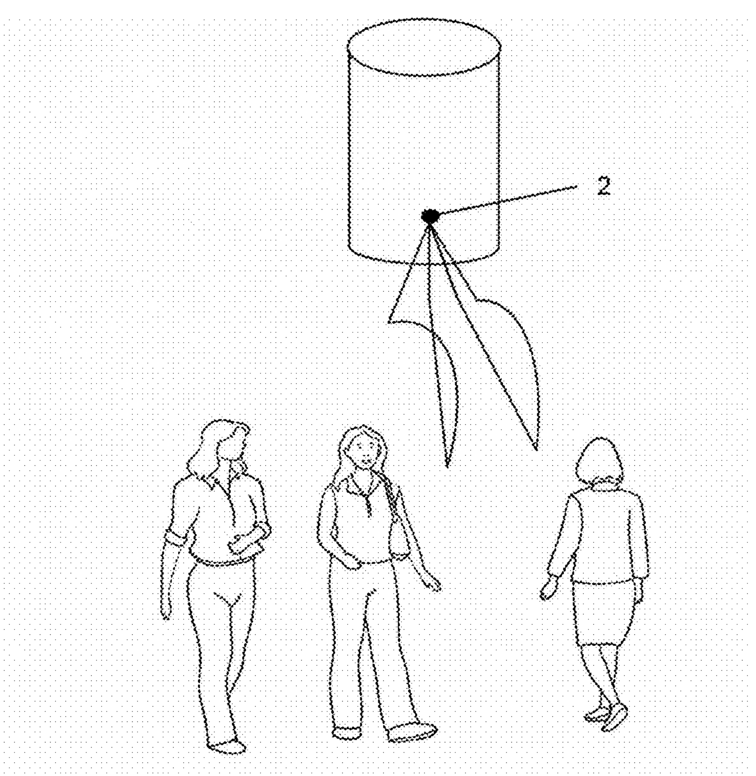
FIG. 4 is a schematic application diagram of a projection of a mobile robot according to an embodiment of the present disclosure.

As shown in FIG. 4, after the projection parameters are determined, the mobile robot may adjust the projection device 2 according to the projection parameters, so that the projection device 2 projects the to-be-projected pattern information onto the ground projection region, and the surrounding pedestrians may know the traveling intention of the mobile robot by checking the projection information on the ground.

In the embodiment, the ground projection region is determined according to the target traveling path information of the mobile robot and the real-time indication information for indicating the road condition around the mobile robot, and the laser projection device is adjusted based on the determined projection parameters corresponding to the to-be-projected pattern, to project the to-be-projected pattern representing the traveling intention of the mobile robot onto the ground projection region, so that the pedestrians can know the traveling intention of the mobile robot according to the projection pattern information projected onto the ground by the projection device, which solves the technical problem of dissatisfactory interaction effect caused by the ambient noisy in the space where the robot is located, and improves the interaction effect between the mobile robot and pedestrians.

Figure 5:
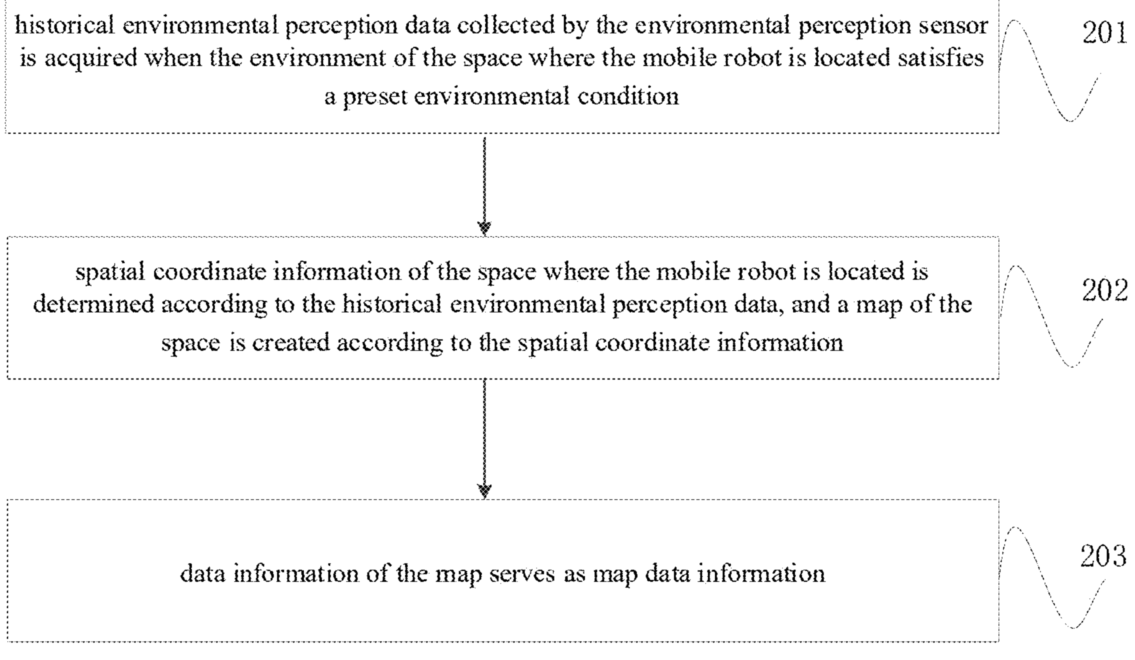
FIG. 5 is a flow chart of step 101 according to an embodiment of the present disclosure.

In the implementation of the present application, referring to FIG. 5 and based on the embodiment shown in FIG. 2, before the step 101 of acquiring the map data information of the space where the mobile robot is located and the real-time environmental perception data collected by the environmental perception sensor, the interaction method for the mobile robot provided in the embodiment may further include steps 201, 202 and 203.

Step 201: historical environmental perception data collected by the environmental perception sensor is acquired when the environment of the space where the mobile robot is located satisfies a preset environmental condition.

The preset environmental condition may include at least one of: a small number of pedestrians in the environment of the space where the mobile robot is located, and no pedestrian in the environment of the space where the mobile robot is located.

In some embodiments, the historical environmental perception data may include static obstacle information existing in the space where the mobile robot is located, such as a table, a chair or a trash can. When the preset environmental condition is that the number of pedestrians in the space where the mobile robot is located is smaller, the pedestrian-related information in the original perception data collected by the environmental perception sensor is filtered out to obtain the historical environmental perception data.

In some embodiments, the mobile robot determines when to collect the historical environmental perception data according to collection time information of the acquired historical environmental perception data, for example, the collection time of the historical environmental perception data is set to 23:00 every night.

Step 202: spatial coordinate information of the space where the mobile robot is located is determined according to the historical environmental perception data, and a map of the space is created according to the spatial coordinate information.

The spatial coordinate information is spatial coordinate information of the entire space where the mobile robot is located or the spatial coordinate information of a space that the mobile robot may pass through. For example, spatial coordinate information of a restaurant or a shopping mall, or spatial coordinate information of a space corresponding to a service region in the shopping mall where the mobile robot is located. For example, when the service region of the mobile robot is a region on the second floor of the shopping mall, the spatial coordinate information of the second floor of the shopping mall needs to be determined.

The spatial coordinate information is two-dimensional coordinate information or three-dimensional coordinate information. In some embodiments, as shown in FIG. 3, two-dimensional coordinates are established using the ground as a plane and a reference position point is set. For example, the reference position point is a position point of a static obstacle in the space, or a reference object is placed on the ground and a position point where the reference object is located serves as the reference position point. Based on the two-dimensional coordinate of the reference position point, two-dimensional coordinates corresponding to other position points in the space are determined.

Step 203: data information of the map serves as map data information.

In the embodiment, the historical environmental perception data collected by the environmental perception sensor is acquired when the environment of the space where the mobile robot is located satisfies the preset environmental condition, to determine the spatial coordinate information of the space, and a map of the space is created according to the spatial coordinate information. Since the map is constructed based on the historical environmental perception data collected in a spatial environment that satisfies the preset environmental condition, interference information in the space is reduced, thereby reducing the difficulty of the map construction and the amount of the map data information.

Figures 6, 7:
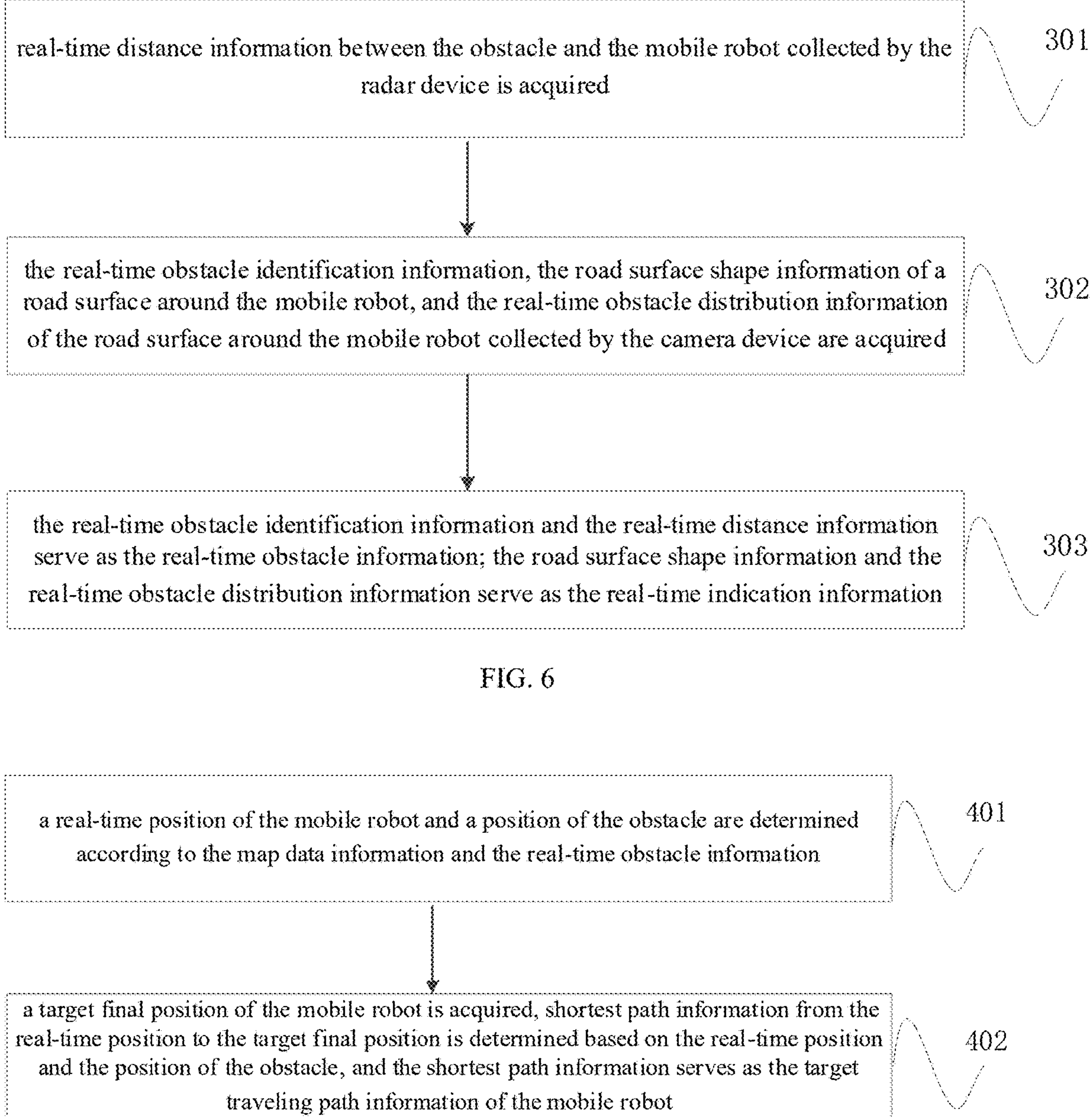
FIG. 6 is a flow chart of step 101 according to another embodiment of the present disclosure.
FIG. 7 is a flow chart of step 102 according to an embodiment of the present disclosure.

In the embodiment of the present application, each environmental perception sensor may include a radar device and a camera device. Referring to FIG. 6, the embodiment involves the process of acquiring the real-time environmental perception data collected by the environmental perception sensor in the step 101. Based on the embodiment shown in FIG. 5, as shown in FIG. 6, the process may include steps 301, 302 and 303.

Step 301: real-time distance information between the obstacle and the mobile robot collected by the radar device is acquired.

In some embodiments, the radar device may at least include one of a lidar device and an ultrasonic radar device. The lidar device is configured to detect a distance between an object around the robot and the robot in a 2D or 3D plane range.

Step 302: the real-time obstacle identification information, the road surface shape information of a road surface around the mobile robot, and the real-time obstacle distribution information of the road surface around the mobile robot collected by the camera device are acquired.

In some embodiments, the camera device may include an RGBD camera; or the camera device may include an RGBD camera and an RGB camera.

The real-time obstacle identification information may include whether the obstacle is a pedestrian. In some embodiments, an image recognition algorithm is utilized to identify an image of the obstacle collected by the RGB camera or the RGBD camera, to determine whether the obstacle is a pedestrian.

In some embodiments, when the camera device includes the RGBD camera and the RGB camera, the RGB camera is used in conjunction with the radar device. When the radar device detects an obstacle, the mobile robot actuates the RGB camera to perform a collection operation to obtain the real-time obstacle identification information.

Step 303: the real-time obstacle identification information and the real-time distance information serve as the real-time obstacle information; the road surface shape information and the real-time obstacle distribution information serve as the real-time indication information.

In the embodiments of the present disclosure, the real-time distance information between the obstacle and the mobile robot is acquired by means of the radar device; the real-time obstacle identification information, the road surface shape information of the road surface around the mobile robot, and the real-time obstacle distribution information of the road surface around the mobile robot are acquired by means of the camera device, thereby implementing the acquisition of the real-time environmental perception data. The combined use of multiple collection devices improves the diversity of the real-time environmental perception data and the reliability of the real-time environmental perception data.

In the embodiment of the present disclosure, referring to FIG. 7. and based on the embodiment shown in FIG. 2, the embodiment involves the step of acquiring the target traveling path information of the mobile robot based on the real-time environmental perception data and the map data information in the step 102, which may include the following steps 401 and 402.

Step 401: a real-time position of the mobile robot and a position of the obstacle are determined according to the map data information and the real-time obstacle information.

In some embodiments, the coordinate position of the mobile robot in the map is acquired as the real-time position, and then the coordinate position of the obstacle in the map is determined as the position of the obstacle according to the real-time obstacle information.

Step 402: a target final position of the mobile robot is acquired, shortest path information from the real-time position to the target final position is determined based on the real-time position and the position of the obstacle, and the shortest path information serves as the target traveling path information of the mobile robot.

In some embodiments, a shortest path algorithm is utilized to determine the shortest path information from the real-time position to the target final position. The shortest path algorithm may include the Dijkstra algorithm, the Bellman-Ford algorithm, the Floyd algorithm and the SPFA algorithm, etc.

In the embodiment, the real-time position of the mobile robot and the position of the obstacle are determined according to the map data information and the real-time obstacle information, and the target final position of the mobile robot is acquired; the shortest path information between the real-time position and the target final position is determined based on the real-time position and the position of the obstacle, thereby implementing the real-time determination of the target traveling path information of the mobile robot, and improving the reliability of the path planning of the mobile robot.

In the embodiment of the present disclosure, referring to FIG. 8 and based on the embodiment shown in FIG. 2, the embodiment involves the step of determining the projection parameter of the laser projection device according to the to-be-projected pattern information and the ground projection region in the step 103, which may include the following steps 501 and 502.

Step 501: for each pixel point in the to-be-projected pattern, a projection angle, projection time, and a projection color corresponding to each pixel point are determined according to the ground projection region.

In some embodiments, a corresponding relationship between each pixel point in the to-be-projected pattern and a spatial coordinate point in the ground projection region is acquired, and the projection angle, the projection time and the projection color corresponding to each pixel point are determined according to the corresponding relationship.

In some embodiments, as shown in FIG. 9, the ground projection region may include an uneven region. Vertical distance information between the road surface around the mobile robot and the RGBD camera is acquired by means of the RGBD camera.

For each pixel point, the original projection angle, the projection time and the projection color corresponding to the to-be-projected pattern information projected onto a flat road surface are first set, and then a projection angle correction parameter is acquired according to the vertical distance information between the road surface around the mobile robot and the RGBD camera. The actual projection angle corresponding to the sampling point is finally obtained according to the projection angle correction parameter and the original projection angle, the actual projection angle is the projection angle corresponding to the sampling point.

Step 502: the projection angle, the projection time, and the projection color corresponding to each pixel point serve as the projection parameters of the laser projection device.

In the embodiment, the determination of the projection parameters of the projection device is implemented by determining the projection angle, the projection time and the projection color corresponding to each pixel point in the to-be-projected pattern terminal, thereby improving the projection effect of the to-be-projected pattern. Meanwhile, the color information of each pixel point can be set, so that the projection pattern projected onto the road surface is a colorful pattern, which makes it easier to attract the attention of surrounding pedestrians and further improves the interaction effect between the mobile robot and the pedestrians.

Figure 10:
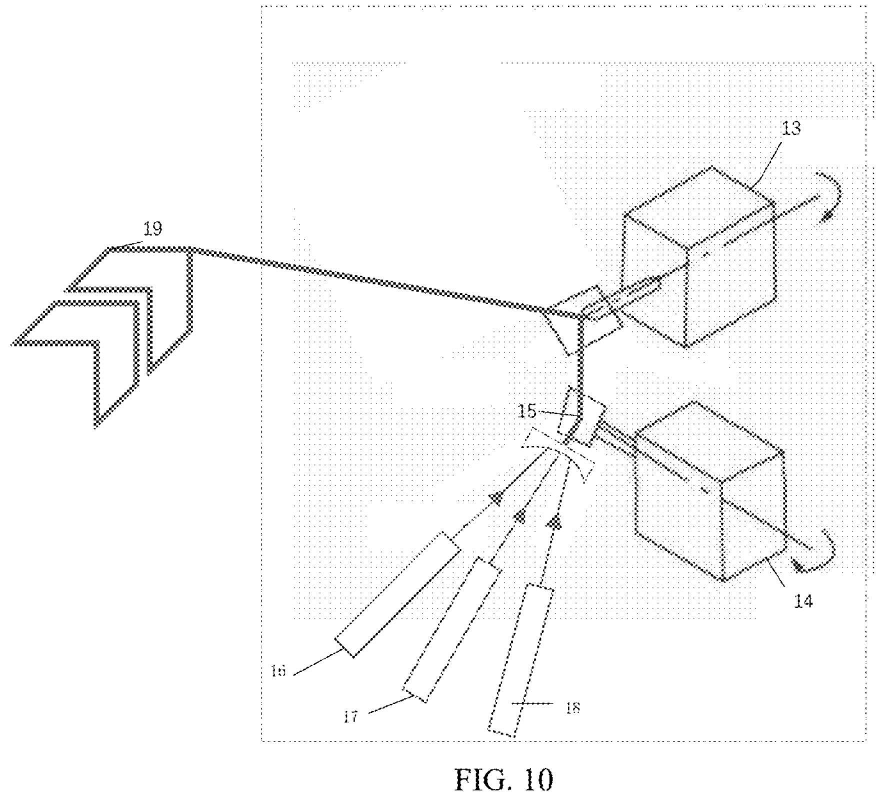
FIG. 10 is a schematic structure diagram of a laser projection device according to an embodiment of the present disclosure.
Figure 11:
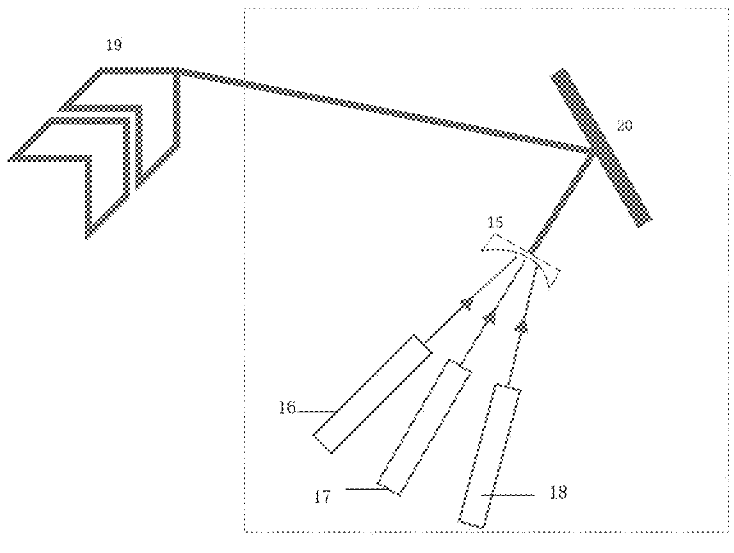
FIG. 11 is a schematic structure diagram of a laser projection device according to another embodiment of the present disclosure.

In the embodiment of the present disclosure, the projection device may include a galvanometer, a visible laser, and a lens, as shown in FIGS. 10 and 11. The galvanometer is a rotating galvanometer or a MEMS solid-state galvanometer, which is configured to control the projection direction of the laser. The visible laser is configured to emit the laser beam in the visible light band for display, and the lens is configured to synthesize laser beams of multiple colors.

In an embodiment, when the galvanometer is a rotating galvanometer, as shown in FIG. 10, the projection device may include a first rotating galvanometer 13, a second rotating galvanometer 14, a lens 15, a first visible laser 16, a second visible laser 17, and a third visible laser 18. The first visible laser 16, the second visible laser 17, and the third visible laser 18 respectively emit a laser beam. The lens 15 synthesizes the received laser beams into one laser beam. Since the first rotating galvanometer 13 and the second rotating galvanometer 14 adjust the direction of the synthesized laser beam, the to-be-projected pattern 19 is finally projected.

In another embodiment, when the galvanometer is a MEMS solid-state galvanometer, as shown in FIG. 11, the projection device may include a MEMS solid-state galvanometer 20, a lens 15, a first visible laser 16, a second visible laser 17, and a third visible laser 18. The first visible laser 16, the second visible laser 17, and the third visible laser 18 respectively emit the laser beam. The lens 15 synthesizes the received laser beams into one laser beam, and then the MEMS solid-state galvanometer 20 adjusts the direction of the synthesized laser beam. Finally, the to-be-projected pattern 19 is projected.

Figures 12, 13:
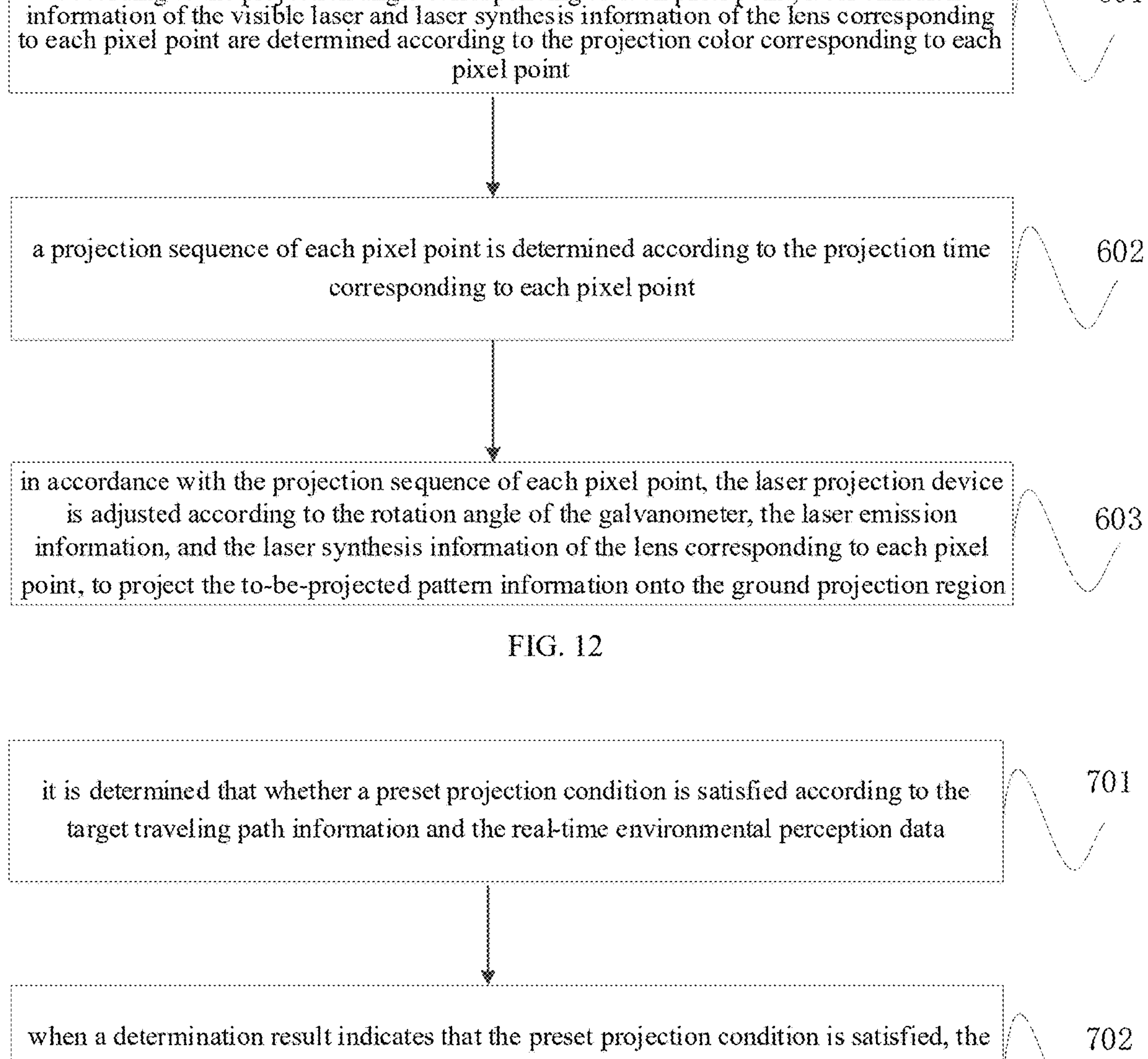
FIG. 12 is a flow chart of step 104 according to an embodiment of the present disclosure.
FIG. 13 is a flow chart showing an interaction method for a mobile robot according to another embodiment of the present disclosure.

Referring to FIG. 12, based on the embodiment shown in FIG. 9, the embodiment involves the step of adjusting the laser projection device according to the projection parameters to project the to-be-projected pattern information onto the ground projection region in the step 104, which may include the following steps 601, 602 and 603.

Step 601: a rotation angle of the galvanometer corresponding to each pixel point is determined according to the projection angle corresponding to each pixel point; laser emission information of the visible laser and laser synthesis information of the lens corresponding to each pixel point are determined according to the projection color corresponding to each pixel point.

The laser beam corresponding to the visible laser includes three primary color laser beams, i.e., red, green, and blue (RGB) laser beams; and the laser emission information may include a visible frequency band. In some embodiments, the visible frequency bands corresponding to the three visible lasers in FIG. 10 or FIG. 11 are determined according to the projection colors.

Step 602: a projection sequence of each pixel point is determined according to the projection time corresponding to each pixel point.

Step 603: in accordance with the projection sequence of each pixel point, the laser projection device is adjusted according to the rotation angle of the galvanometer, the laser emission information, and the laser synthesis information of the lens corresponding to each pixel point, to project the to-be-projected pattern information onto the ground projection region.

In the embodiment, the visual display of the to-be-projected pattern information in the ground projection region is implemented, and colorful patterns can be projected onto the ground to facilitate grabbing the attention of pedestrians and improve the interactive effect.

In the embodiment of the present disclosure, referring to FIG. 13 and based on the embodiment shown in FIG. 2, before the step of determining the ground projection region according to the target traveling path information and the real-time indication information, the interaction method for the mobile robot may further include following steps.

Step 701: it is determined whether a preset projection condition is satisfied according to the target traveling path information and the real-time environmental perception data.

The preset projection condition may at least include one of: the traveling direction of the mobile robot changes within the preset time period in the future, a traveling state of the mobile robot is a paused state, there exists a pedestrian around the mobile robot, and the mobile robot is currently in an operating state.

In some embodiments, the preset projection condition is related to the traveling situation of the mobile robot. Different to-be-projected pattern information can be set for different preset projection conditions. For example, when the traveling direction of the mobile robot changes, the to-be-projected pattern information may be "a combining form of an arrow mark and text corresponding to the traveling direction". When the traveling state of the mobile robot is a paused state, the to-be-projected pattern information may be a text pattern "follow you" or "start walking in xxx minutes", etc.

In some embodiments, the preset projection condition is that the mobile robot is currently in an operating state. By detecting whether the mobile robot is powered on, when the mobile robot is powered on, the projection device is actuated to project. In this case, the projection device of the mobile robot is always in a state with a projection pattern. The projection pattern projected onto the ground may be changed in real time.

In some embodiments, the preset projection condition is that an intensity of a sound around the mobile robot is higher than a preset value. A sound collection device is provided on the mobile robot, and is configured to collect the sound around the mobile robot. When the intensity of the surrounding sound is higher than the preset value, the projection mode is utilized to perform the interaction; when the intensity of the surrounding sound is lower than the preset value, a voice reminder mode is utilized to perform the interaction.

Step 702: when a determination result indicates that the preset projection condition is satisfied, the ground projection region is determined according to the target traveling path information.

In the embodiment, it is determined whether the preset projection condition is satisfied according to the target traveling path information and the real-time environmental perception data. When the determination result is that the preset projection condition is satisfied, the ground projection region is determined according to the target traveling path information. The projection of the to-be-projected pattern is only performed when the preset projection condition is satisfied, which improves the flexibility of the projection settings of the projection device, reduces the energy loss and calculation amount of the mobile robot, and increases the service life of the laser projection device.

In the embodiment of the present disclosure, based on the embodiment shown in FIG. 13, when the projection condition is that the mobile robot is currently in an operating state, the step of acquiring the to-be-projected pattern in the step 103 may include the following steps.

Step 801: it is determined whether the pattern currently projected by the mobile robot is capable of reflecting the traveling intention of the mobile robot according to the target traveling path information.

The pattern currently projected by the mobile robot is the projection pattern projected onto the ground at the current moment.

Step 802: when the pattern currently projected by the mobile robot is capable of reflecting the traveling intention of the mobile robot, the pattern currently projected by the mobile robot serves as the to-be-projected pattern.

The projection pattern is a projection pattern to be projected onto the ground at the next moment point of the current moment.

Step 803: when the pattern currently projected by the mobile robot is incapable of reflecting the traveling intention of the mobile robot, the to-be-projected pattern is generated according to the traveling intention of the mobile robot.

In some embodiments, different to-be-projected patterns are provided according to different traveling intentions of the mobile robot. When the traveling intention of the mobile robot changes, the pattern projected onto the ground may also change, that is, the projection pattern at the next moment is different from the projection pattern at the previous moment. For example, when the traveling intention of the mobile robot changes, that is, from "straight ahead" to "turn left" or "turn right", the pattern currently projected (indicating "straight ahead") is converted into a projection pattern indicating "turn left" or "turn right".

In the embodiment, whether the pattern currently projected by the mobile robot can reflect the traveling intention of the mobile robot is determined and the to-be-projected pattern is generated according to the traveling intention of the mobile robot when the traveling intention of the mobile robot cannot be reflected, accordingly the projection pattern is adjusted in real time according to the traveling intention of the mobile robot, so that the pedestrians can accurately grasp the traveling intention of the mobile robot, thereby improving the accuracy of the information conveyed by the mobile robot to the pedestrians, and further improving the interaction effect between the mobile robot and pedestrians.

Figure 14A:
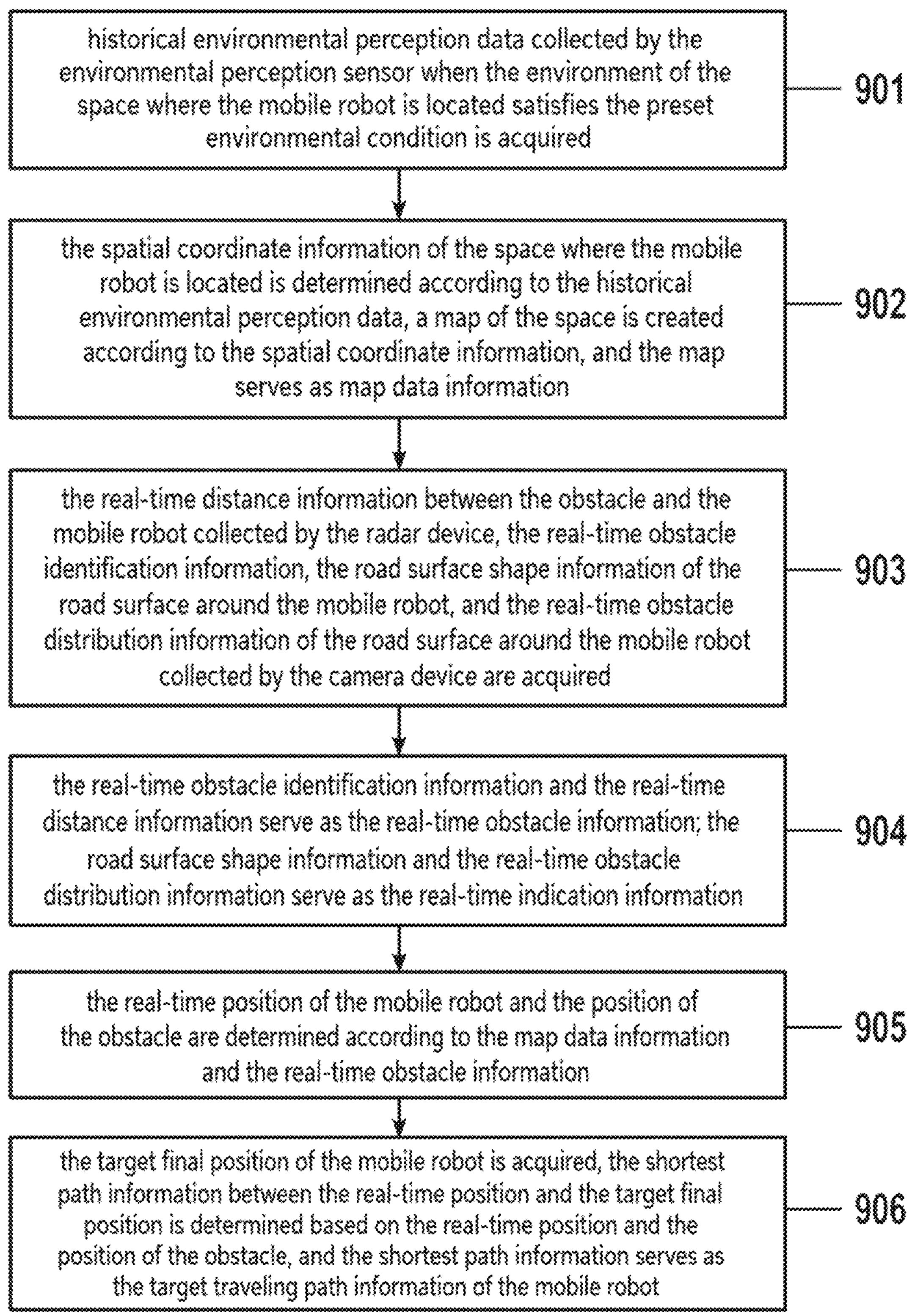
FIGS. 14A and 14B are flowcharts showing an interaction method for a mobile robot according to another embodiment of the present disclosure.
Figure 14B:
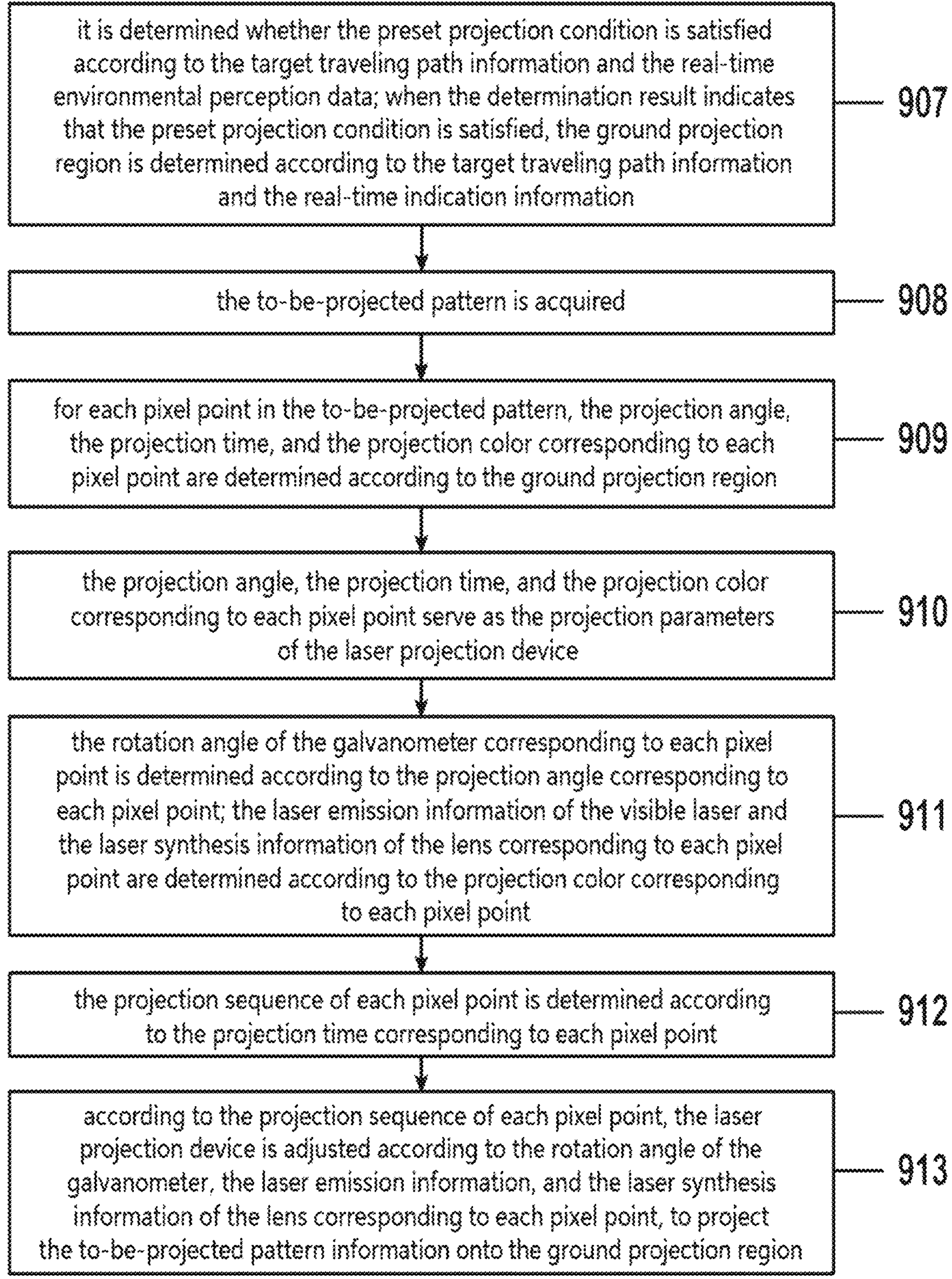

In the embodiment of the present disclosure, as shown in FIGS. 14A and 14B, an interaction method for a mobile robot is provided. The method may include the following steps.

Step 901: historical environmental perception data collected by the environmental perception sensor when the environment of the space where the mobile robot is located satisfies the preset environmental condition is acquired.

Step 902: the spatial coordinate information of the space where the mobile robot is located is determined according to the historical environmental perception data, a map of the space is created according to the spatial coordinate information, and the map serves as map data information.

Step 903: the real-time distance information between the obstacle and the mobile robot collected by the radar device, the real-time obstacle identification information, the road surface shape information of the road surface around the mobile robot, and the real-time obstacle distribution information of the road surface around the mobile robot collected by the camera device are acquired.

Step 904: the real-time obstacle identification information and the real-time distance information serve as the real-time obstacle information; the road surface shape information and the real-time obstacle distribution information serve as the real-time indication information.

Step 905: the real-time position of the mobile robot and the position of the obstacle are determined according to the map data information and the real-time obstacle information.

Step 906: the target final position of the mobile robot is acquired, the shortest path information between the real-time position and the target final position is determined based on the real-time position and the position of the obstacle, and the shortest path information serves as the target traveling path information of the mobile robot.

Step 907: it is determined whether the preset projection condition is satisfied according to the target traveling path information and the real-time environmental perception data; when the determination result indicates that the preset projection condition is satisfied, the ground projection region is determined according to the target traveling path information and the real-time indication information.

The preset projection condition may at least include one of the following conditions: the traveling direction of the mobile robot changes within a preset time period in the future, the traveling state of the mobile robot is the paused state, there exists a pedestrian around the mobile robot, and the mobile robot is currently in the operating state.

Step 908: the to-be-projected pattern is acquired.

When the preset projection condition is that the mobile robot is currently in the operating state, it is determined according to the target traveling path information whether the pattern currently projected by the mobile robot can reflect the traveling intention of the mobile robot; when the pattern currently projected by the mobile robot can reflect the traveling intention of the mobile robot, the pattern currently projected by the mobile robot serves as the to-be-projected pattern; when the pattern currently projected by the mobile robot cannot reflect the traveling intention of the mobile robot, the to-be-projected pattern is generated according to the traveling intention of the mobile robot.

Step 909: for each pixel point in the to-be-projected pattern, the projection angle, the projection time, and the projection color corresponding to each pixel point are determined according to the ground projection region.

Step 910: the projection angle, the projection time, and the projection color corresponding to each pixel point serve as the projection parameters of the laser projection device.

Step 911: the rotation angle of the galvanometer corresponding to each pixel point is determined according to the projection angle corresponding to each pixel point; the laser emission information of the visible laser and the laser synthesis information of the lens corresponding to each pixel point are determined according to the projection color corresponding to each pixel point.

Step 912: the projection sequence of each pixel point is determined according to the projection time corresponding to each pixel point.

Step 913: according to the projection sequence of each pixel point, the laser projection device is adjusted according to the rotation angle of the galvanometer, the laser emission information, and the laser synthesis information of the lens corresponding to each pixel point, to project the to-be-projected pattern information onto the ground projection region.

In the embodiment, the to-be-projected pattern is projected by the laser projection device onto the ground, so that the pedestrians know the traveling intention of the mobile robot, thereby improving the interaction effect between the mobile robot and pedestrians, and solving the technical problem of dissatisfactory interaction effect caused by the ambient noisy in the space where the robot is located. Moreover, the projection pattern projected onto the road surface can be a colorful pattern, which can better capture the attention of the pedestrians and improve the interaction effect. In addition, the projection condition can be preset to improve the flexibility of the projection device, and the projection pattern can be adjusted according to the actual scene, thereby improving the accuracy of information conveyed by the mobile robot to the pedestrians, and further improving the interaction effect between the mobile robot and pedestrians.

In an embodiment of the present disclosure, after the step of controlling the projection device according to the projection parameters to project the to-be-projected pattern onto the ground projection region in step 104, the interaction method for the mobile robot may further include the following steps.

Step 105: the to-be-projected pattern is projected in real time during the operating process, and an obstacle region existing on the road surface is acquired during the operating process.

Step 106: it is detected whether there exists an overlap region between the to-be-projected pattern and the obstacle region, when there exists the overlap region between the to-be-projected pattern and the obstacle region, the to-be-projected pattern is adjusted according to the overlap region, such that there is no overlap region between the to-be-projected pattern and the obstacle region.

In the embodiment, the to-be-projected pattern may specifically be a traveling indicator pattern. By determining the curve overlap region between the to-be-projected pattern and the obstacle region, the to-be-projected pattern is adjusted according to the curve overlap region, so that the to-be-projected pattern emitted by the robot is dynamically deformed according to different obstacle regions, and the adjusted to-be-projected pattern does not overlap with the obstacle region, thereby implementing the information interaction between the robot and the obstacle, and improving the efficiency and the accuracy of the information interaction between the robot and humans.

In an embodiment, the step of acquiring the obstacle region existing on the road surface during the operating process may include:

- the obstacle information is collected in real time during the operating process, and pixel information corresponding to the obstacle information is mapped into a preset projection pattern;
- a region with a minimum area including all the pixel information is determined from the projection region, and the region with the minimum area is recorded as the obstacle region.

In an embodiment, the to-be-projected pattern may include an initial to-be-projected pattern and different magnified to-be-projected patterns which are generated at different moments and at different magnification scales. The step of projecting the to-be-projected pattern in real time during the operating process may include:

- the initial to-be-projected pattern is projected, and the magnified to-be-projected patterns generated and the initial to-be-projected pattern are arranged and projected at different moments.

In an embodiment, the to-be-projected pattern may include at least one of the initial to-be-projected pattern and the magnified to-be-projected pattern. The step of projecting the to-be-projected pattern in real time during the operating process may include:

- the initial to-be-projected pattern is gradually magnified according to a preset magnification scale to form the magnified to-be-projected pattern, and at least one of the initial to-be-projected pattern and the magnified to-be-projected pattern are projected.

In an embodiment, the step of gradually magnifying the initial to-be-projected pattern according to the preset magnification scale to form the magnified to-be-projected pattern, and projecting at least one of the initial to-be-projected pattern and the magnified to-be-projected pattern may include the following steps.

Step 107: the initial to-be-projected pattern is acquired.

Step 108: the initial to-be-projected pattern is gradually magnified according to a preset magnification scale to form a magnified to-be-projected pattern.

Step 109: at least one of the initial to-be-projected pattern and the magnified to-be-projected pattern are displayed in a time sequence, and the at least one of the initial to-be-projected pattern and the magnified to-be-projected pattern displayed is the to-be-projected pattern.

In an embodiment, the step of adjusting the to-be-projected pattern according to the overlap region may include:

- two curve intersection points of an overlap to-be-projected pattern and the obstacle region in the overlap region are determined, in which the overlap to-be-projected pattern refers to the initial to-be-projected pattern or the magnified to-be-projected pattern;
- a line segment between the two curve intersection points in the overlap to-be-projected pattern is removed, and two remaining curve segments in the overlap to-be-projected pattern after the removing are obtained;
- a mid-perpendicular intersection point corresponding to a connecting line between the two curve intersection points is determined;
- a vertical distance between the mid-perpendicular intersection point and a boundary intersection point is detected, and the vertical distance is compared to a preset distance threshold value, in which the boundary intersection point refers to an intersection point of the mid-perpendicular and an edge of the obstacle region, and the boundary intersection point is located within the curve overlap region;
- when the vertical distance is less than or equal to the preset distance threshold value, the to-be-projected pattern is adjusted according to the two remaining curve segments, the curve intersection points, and the boundary intersection point.

In an embodiment, the step of adjusting the to-be-projected pattern according to the overlap region may include:

- the initial to-be-projected pattern or the magnified to-be-projected pattern having an overlap region with the obstacle region is recorded as the overlap to-be-projected pattern; in which the overlap to-be-projected pattern may include an overlap region overlapping the obstacle region and a remaining region which does not overlap with the obstacle region;
- the overlap region of the overlap to-be-projected pattern is removed, or the overlap to-be-projected pattern is reduced according to a preset scale to allow the overlap to-be-projected pattern to be tangent to the edge of the obstacle region, to obtain the adjusted to-be-projected pattern.

In an embodiment, the step of adjusting the to-be-projected pattern according to the two remaining curve segments, the curve intersection points and the boundary intersection point to obtain the adjusted to-be-projected pattern may include:

- the two curve intersection points are connected to the boundary intersection point through a preset connection mode to obtain a connecting line segment;
- the to-be-projected pattern formed by connecting the two remaining curve segments with the connecting line segment is recorded as the adjusted to-be-projected pattern.

In an embodiment, after the step of comparing the vertical distance to the preset distance threshold value, the method may further include:

- when the vertical distance is greater than the preset distance threshold value, the projection of the to-be-projected pattern is stopped.

In an embodiment, after the step of adjusting the to-be-projected pattern according to the overlap region, the method may further include:

- current position information of the robot is acquired, and the position distance between the robot and the obstacle region is determined based on the current position information;
- a color parameter of the adjusted to-be-projected pattern is determined according to the position distance, and the adjusted to-be-projected pattern is projected according to the color parameter.

It should be appreciated that the sequence number of each step in the above embodiments does not mean the execution order. The execution order of each process should be determined by function and internal logic thereof, and should not constitute any limitation on the implementation process of the embodiment of the present disclosure.

It should be appreciated that although the steps in the flowcharts of FIGS. 2, 5 to 8, 12 to 14, and 16 to 17 are shown in sequence as indicated by arrows, these steps are not definitely executed in sequence indicated by the arrows. Unless explicitly stated in this article, there is no strict order restriction on the execution of these steps, and these steps can be executed in other orders. Moreover, at least part of the steps in FIGS. 2, 5 to 8, 12 to 14, and 16 to 17 may include multiple steps or multiple stages, and these steps or stages are not definitely executed at the same moment, but may be executed at different moments. The execution order of these steps or stages is not definitely sequential, but may be executed in turns or alternately with other steps or at least part of the steps or stages in other steps.

Figures 15, 16:
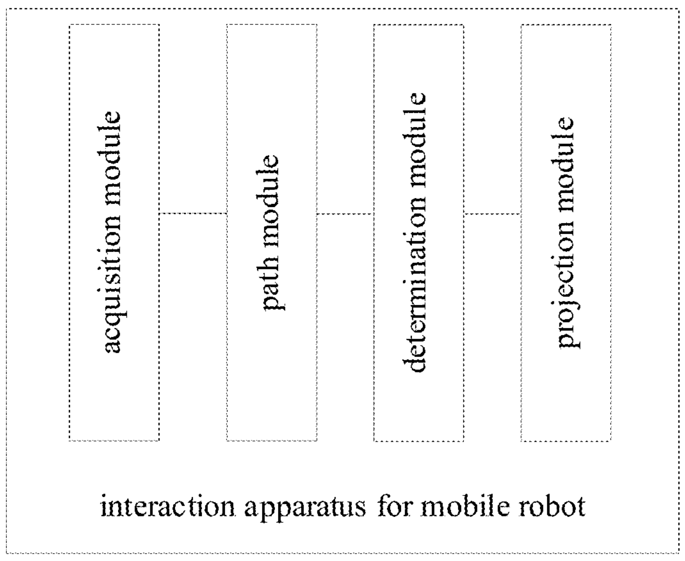
FIG. 15 is a structure diagram illustrating an interaction apparatus for a mobile robot according to an embodiment of the present disclosure.
FIG. 16 is a flow chart of an interaction method based on a mobile robot according to an embodiment of the present disclosure.

In the embodiment of the present disclosure, as shown in FIG. 15, an interaction apparatus for a mobile robot is provided. The apparatus may include an acquisition module, a path module, a determination module, and a projection module.

The acquisition module is configured to acquire map data information of a space where the mobile robot is located and real-time environmental perception data collected by an environmental perception sensor. The real-time environmental perception data may include real-time obstacle information and real-time indication information for indicating a road condition around the mobile robot.

The path module is configured to acquire target traveling path information of the mobile robot based on the real-time obstacle information and the map data information, and determine a ground projection region according to the target traveling path information and the real-time indication information.

The determination module is configured to acquire to-be-projected pattern information, and determine projection parameters corresponding to the to-be-projected pattern according to the to-be-projected pattern and the ground projection region. The to-be-projected pattern information is configured to indicate a traveling intention of the mobile robot.

The projection module is configured to control the projection device according to the projection parameters to project the to-be-projected pattern information onto the ground projection region.

In an embodiment, the apparatus may further include a map module, which is specifically configured to:

acquire historical environmental perception data collected by the environmental perception sensor when the environment of the space where the mobile robot is located satisfies a preset environmental condition;

determine spatial coordinate information of the space where the mobile robot is located according to the historical environmental perception data, and create a map of the space according to the spatial coordinate information;

determine data information of the map as map data information.

In an embodiment, the environmental perception sensor may include a radar device and a camera device, and the acquisition module is configured to:

acquire real-time distance information between the obstacle and the mobile robot collected by the radar device;

acquire the real-time obstacle identification information, road surface shape information of a road surface around the mobile robot, and real-time obstacle distribution information of the road surface around the mobile robot collected by the camera device;

determine the real-time obstacle identification information and the real-time distance information as the real-time obstacle information, and determine the road surface shape information and the real-time obstacle distribution information as the real-time indication information.

In an embodiment, the path module is configured to:

determine a real-time position of the mobile robot and a position of the obstacle according to the map data information and the real-time obstacle information;

acquire a target final position of the mobile robot, determine shortest path information from the real-time position to the target final position based on the real-time position and the position of the obstacle, and determine the shortest path information as the target traveling path information of the mobile robot.

In an embodiment, the determination module is configured to:

for each pixel point in the to-be-projected pattern, determine a projection angle, projection time, and a projection color corresponding to each pixel point according to the ground projection region;

determine the projection angle, the projection time, and the projection color corresponding to each pixel point as projection parameters of the projection device.

In an embodiment, the projection device may include a galvanometer, a visible laser, and a lens; and the projection module is configured to:

determine a rotation angle of the galvanometer corresponding to each pixel point according to the projection angle corresponding to each pixel point, and determine laser emission information of the visible laser and laser synthesis information of the lens corresponding to each pixel point according to the projection color corresponding to each pixel point;

determine a projection sequence of each pixel point according to the projection time corresponding to each pixel point;

in accordance with the projection sequence of each pixel point, adjust the projection device according to the rotation angle of the galvanometer, the laser emission information, and the laser synthesis information of the lens corresponding to each pixel point, to project the to-be-projected pattern information onto the ground projection region.

In an embodiment, the path module is further specifically configured to:

determine whether a preset projection condition is satisfied according to the target traveling path information and the real-time environmental perception data;

determine the ground projection region according to the target traveling path information when a determination result indicates that the preset projection condition is satisfied.

In an embodiment, the preset projection condition may at least include one of the following conditions:

the traveling direction of the mobile robot changes within a preset time period in the future, the traveling state of the mobile robot is a paused state, there exists a pedestrian around the mobile robot, and the mobile robot is currently in the operating state.

In an embodiment, the determination module is specifically configured to:

determine whether the pattern currently projected by the mobile robot is capable of reflecting the traveling intention of the mobile robot according to the target traveling path information when the projection condition is that the mobile robot is currently in the operating state;

determine the pattern currently projected by the mobile robot as the to-be-projected pattern when the pattern currently projected by the mobile robot is capable of reflecting the traveling intention of the mobile robot;

generate the to-be-projected pattern according to the traveling intention of the mobile robot when the pattern currently projected by the mobile robot is incapable of reflecting the traveling intention of the mobile robot.

In an embodiment, the determination module is further specifically configured to:

when the real-time obstacle information indicates that the obstacle around the mobile robot is a movable obstacle, determine whether the pattern currently projected by the mobile robot is capable of reflecting the traveling intention of the mobile robot according to the target traveling path information.

In an embodiment, the interaction apparatus for the mobile robot may further include:

an obstacle region acquisition module, configured to project the to-be-projected pattern in real time during the operating process, and acquire an obstacle region existing on the road surface during the operating process;

an overlap region detection module, configured to detect whether there exists an overlap region between the to-be-projected pattern and the obstacle region, when there exists the overlap region between the to-be-projected pattern and the obstacle region, adjust the to-be-projected pattern according to the overlap region, such that there is no overlap region between the to-be-projected pattern and the obstacle region.

In an embodiment of the present disclosure, a mobile robot is provided. The mobile robot may include a projection device, an environmental perception sensor, and a processor.

The environmental perception sensor is configured to collect real-time environmental perception data. The real-time environmental perception data may include real-time obstacle information and real-time indication information for indicating a road condition around the mobile robot.

The processor is configured to acquire map data information of a space where the mobile robot is located and the real-time environmental perception data, acquire target traveling path information of the mobile robot based on the real-time obstacle information and the map data information, determine a ground projection region according to the target traveling path information and the real-time indication information, acquire a to-be-projected pattern, and determine a projection parameter corresponding to the to-be-projected pattern according to the to-be-projected pattern and the ground projection region, in which the to-be-projected pattern is configured to indicate a traveling intention of the mobile robot, and control the projection device according to the projection parameters to project the to-be-projected pattern onto the ground projection region.

The projection device is configured to project the to-be-projected pattern onto the ground projection region.

In an embodiment, the processor is further configured to:

acquire historical environmental perception data collected by the environmental perception sensor when the environment of the space where the mobile robot is located satisfies a preset environmental condition, determine spatial coordinate information of the space where the mobile robot is located according to the historical environmental perception data, create a map of the space according to the spatial coordinate information, and determine data information of the map as map data information.

In an embodiment, the environmental perception sensor may include a radar device and a camera device.

The radar device is configured to collect real-time distance information between the obstacle and the mobile robot.

The camera device is configured to collect the real-time obstacle identification information, the road surface shape information of a road surface around the mobile robot, and the real-time obstacle distribution information of the road surface around the mobile robot.

The processor is configured to acquire the real-time obstacle identification information and the real-time distance information as the real-time obstacle information, and acquire the road surface shape information and the real-time obstacle distribution information as the real-time indication information.

In an embodiment, the processor is configured to:

determine a real-time position of the mobile robot and a position of the obstacle according to the map data information and the real-time obstacle information, acquire a target final position of the mobile robot, determine shortest path information from the real-time position to the target final position based on the real-time position and the position of the obstacle, and determine the shortest path information as the target traveling path information of the mobile robot.

In an embodiment, the processor is configured to:

for each pixel point in the to-be-projected pattern, determine a projection angle, projection time, and a projection color corresponding to each pixel point according to the ground projection region, and determine the projection angle, the projection time, and the projection color corresponding to each pixel point as the projection parameters of the projection device.

In an embodiment, the projection device may further include a galvanometer, a visible laser, and a lens. The processor is configured to:

determine a rotation angle of the galvanometer corresponding to each pixel point according to the projection angle corresponding to each pixel point; determine laser emission information of the visible laser and laser synthesis information of the lens corresponding to each pixel point according to the projection color corresponding to each pixel point; determine a projection sequence of each pixel point according to the projection time corresponding to each pixel point; in accordance with the projection sequence of each pixel point, adjust the projection device according to the rotation angle of the galvanometer, the laser emission information, and the laser synthesis information of the lens corresponding to each pixel point, to project the to-be-projected pattern information onto the ground projection region.

The projection device is configured to, in accordance with the projection sequence of each pixel point, project each pixel point onto the ground projection region according to the rotation angle of the galvanometer, the laser emission information, and the laser synthesis information of the lens corresponding to each pixel point.

In an embodiment, the processor is further configured to:

determine whether a preset projection condition is satisfied according to the target traveling path information and the real-time environmental perception data, in which the preset projection condition may at least include one of: the traveling direction of the mobile robot changes within the preset time period in the future, a traveling state of the mobile robot is a paused state, there exists a pedestrian around the mobile robot, and the mobile robot is currently in an operating state; and determine the ground projection region according to the target traveling path information when a determination result indicates that the preset projection condition is satisfied.

In an embodiment, the processor is further configured to:

determine whether the pattern currently projected by the mobile robot is capable of reflecting the traveling intention of the mobile robot according to the target traveling path information when the projection condition is that the mobile robot is currently in the operating state; determine the pattern currently projected by the mobile robot as the to-be-projected pattern when the pattern currently projected by the mobile robot is capable of reflecting the traveling intention of the mobile robot; generate the to-be-projected pattern according to the traveling intention of the mobile robot when the pattern currently projected by the mobile robot is incapable of reflecting the traveling intention of the mobile robot.

In an embodiment, the processor is specifically configured to:

when the real-time obstacle information indicates that the obstacle around the mobile robot is a movable obstacle, determine whether the pattern currently projected by the mobile robot is capable of reflecting the traveling intention of the mobile robot according to the target traveling path information.

Figure 21:
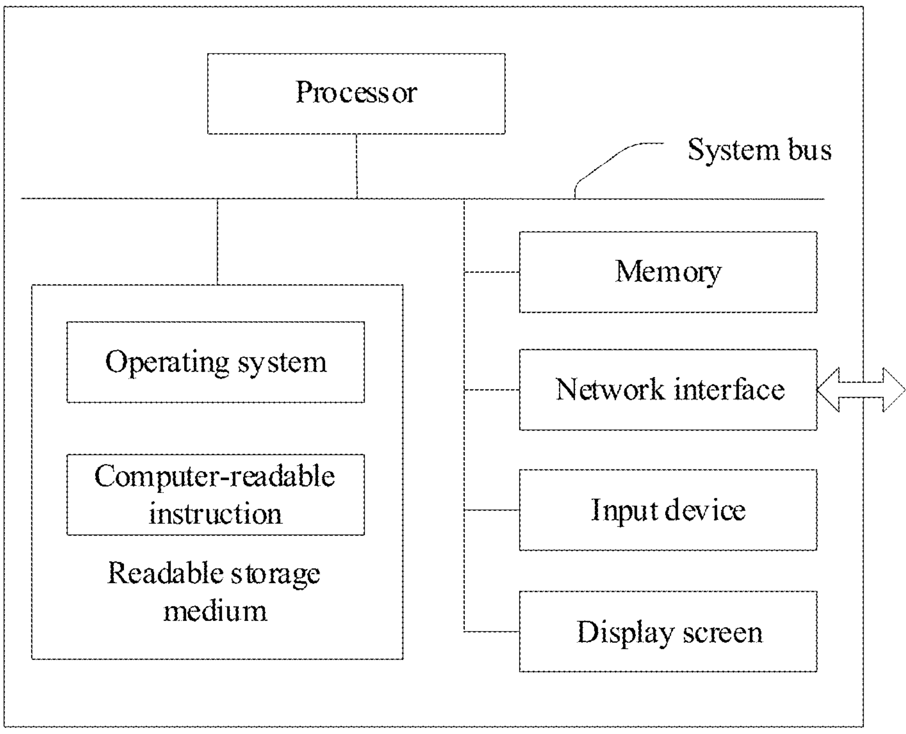
FIG. 21 is a schematic diagram of an internal structure of a robot according to an embodiment of the present disclosure.

In an embodiment, as shown in FIG. 21, the mobile robot may further include a memory storing computer-readable instructions executable on the processor, and the processor is configured to execute the computer-readable instructions to implement the following steps.

Step 105: the to-be-projected pattern is projected in real time during the operating process, and an obstacle region existing on the road surface is acquired during the operating process.

It can be appreciated that the to-be-projected pattern is a to-be-projected pattern representing the traveling intention of the robot. The to-be-projected pattern can be a curve to-be-projected pattern, a straight to-be-projected pattern, an image to-be-projected pattern, etc. The to-be-projected pattern can be projected in real time by the laser device provided on the robot, for example, onto the surface of the road ahead of the robot, or onto a device on the road ahead of the robot. In an embodiment, the to-be-projected pattern is a coherent curve graph formed by presetting a certain number of points in the traveling direction of the robot and connecting the certain number of points with curves or straight lines. In another embodiment, the to-be-projected pattern is a curve obtained by connecting a preset number of curve nodes through Bezier curves. The preset number can be set according to specific requirements. For example, the preset number can be set to 5, 7, 9, 10, etc. The operating process can include: a movement process of the robot, a waiting process of the robot in which the robot stops moving due to an obstacle during the movement, and a process in which the robot is fixed at a certain position without moving after being actuated, etc. In some embodiments, the to-be-projected pattern may specifically be a traveling indicator pattern.

The obstacle region includes a region in which the robot detects the obstacle information in the traveling process. The obstacle information may include static obstacle information and dynamic obstacle information. The static obstacle information refers to position information of a static obstacle (such as an obstacle which cannot move by itself, for example, a table, a chair, a cabinet, etc., in the scene of a food delivery robot). The dynamic obstacle information refers to position information of a dynamic obstacle (such as an object which can move by itself, for example, a pedestrian, other robots, etc.).

In an embodiment, in the step 105, that is, the step of acquiring the obstacle region existing on the road surface during the operating process may include:

the obstacle information is collected in real time during the operating process, and pixel information corresponding to the obstacle information is mapped in a preset projection pattern.

In a specific implementation mode, during the operation of the robot, the static obstacles and the dynamic obstacles can be detected through an obstacle detection device provided on the robot, and then real-time position information of each static obstacle and dynamic obstacle can be obtained, i.e., the obstacle information. The obstacle detection device may be a lidar sensor, an RGB Depth (RGBD) camera or an ultrasonic sensor, etc.

In an embodiment, when the obstacle information is provided on the preset projection pattern, each piece of obstacle information needs to be mapped into pixel information in the preset projection pattern, that is, one piece of obstacle information corresponds to one piece of pixel information. The preset projection pattern may be displayed in a projection display interface provided on the robot. In the preset projection pattern, the information of each obstacle can be represented by the pixel information; and when the obstacle information is collected by the robot, the obstacle information may be updated simultaneously into the preset projection pattern. The projection display interface is a display screen provided on the front or back of the robot, and the display screen may be a touch screen or a dot matrix screen, so that the preset projection pattern and the obstacle information can be displayed on the projection display interface.

A region of a minimum area is determined from the projection region including all the pixel information, and the region of the minimum area is recorded as the obstacle region.

Understandably, during the interaction between the robot and the obstacle, all the obstacle information needs to be covered. Therefore, after the pixel information corresponding to the obstacle information is mapped in the preset projection pattern, a region of a minimum area in a preset shape and containing all pixel information can be divided, and the region of the minimum area is recorded as the obstacle region corresponding to the obstacle information. Optionally, the preset shape can be set to an elliptic shape, a circular shape, a square shape, an irregular shape, etc. In the embodiment, the preset shape is set to the circular shape, and the region of the minimum area is region containing all the pixel information and having a circular shape and a minimum area. If the area of the region is set too large, it may cause data redundancy, and the robot may interact with the obstacle in advance before approaching the obstacle, which may reduce the accuracy of the robot interaction.

In an embodiment, the to-be-projected pattern may include an initial to-be-projected pattern and different magnified to-be-projected patterns which are generated at different moments and at different magnification scales. The step of projecting the to-be-projected pattern in real time during the operating process may include:

the initial to-be-projected pattern is projected, and the magnified to-be-projected patterns generated and the initial to-be-projected pattern are arranged and projected at different moments.

It should be appreciated that the magnified to-be-projected patterns in the embodiment are different magnified to-be-projected patterns generated based on the initial to-be-projected pattern at different magnification scales and at different moments. The number of the magnified to-be-projected patterns may be two, three, etc., which is not limited here. It should be noted that, assuming that after a size of the initial to-be-projected pattern is doubled to obtain a first magnified to-be-projected pattern, even if a second magnified to-be-projected pattern is obtained by doubling a size of the first magnified to-be-projected pattern, the essence thereof is to enlarge the initial to-be-projected pattern by four times. Therefore, after the initial to-be-projected pattern and the magnified to-be-projected patterns generated at different moments and at different magnification scales are acquired, the initial to-be-projected pattern is projected, and the magnified to-be-projected patterns generated and the initial to-be-projected pattern are arranged and projected at different moments. The magnification scale can be selected according to specific magnification requirements.

Figure 17:
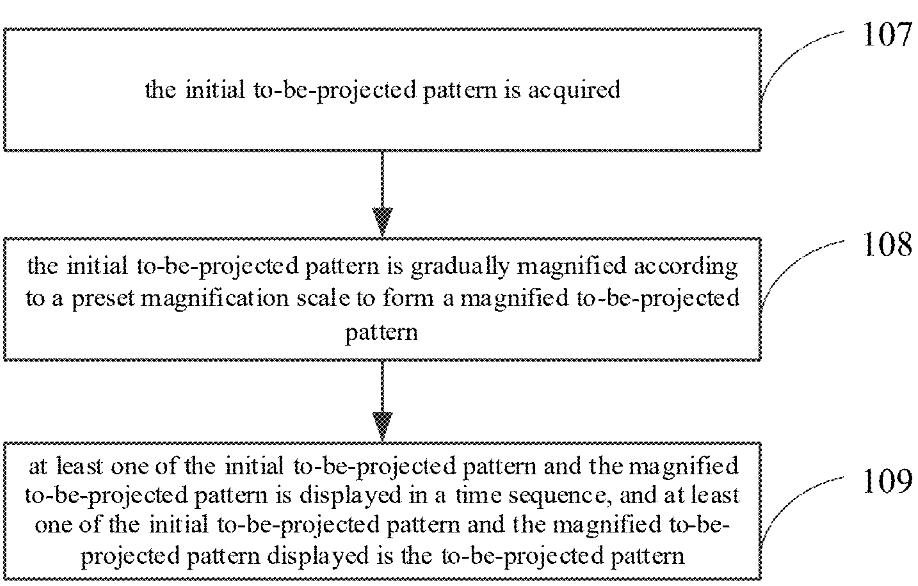
FIG. 17 is a flow chart of step 105 in an obstacle-based robot interaction method according to an embodiment of the present disclosure.

In another embodiment, the to-be-projected pattern may include at least one of an initial to-be-projected pattern and a magnified to-be-projected pattern; and the magnified to-be-projected pattern is obtained by magnifying the initial to-be-projected pattern at a preset magnification scale, as shown in FIG. 17, the step of projecting the to-be-projected pattern in real time during the operating process may include:

the initial to-be-projected pattern is gradually magnified according to a preset magnification scale to form the magnified to-be-projected pattern, and the at least one of the initial to-be-projected pattern and the magnified to-be-projected pattern is projected.

The step of gradually magnifying the initial to-be-projected pattern according to the preset magnification scale to form the magnified to-be-projected pattern, and projecting at least one of the initial to-be-projected pattern and the magnified to-be-projected pattern may include the following steps.

Step 107: the initial to-be-projected pattern is acquired.

It should be appreciated that the to-be-projected pattern may include at least one of the initial to-be-projected pattern and the magnified to-be-projected pattern. If no initial to-be-projected pattern appears in the to-be-projected pattern at the current moment, the initial to-be-projected pattern may appear at a subsequent moment. The initial to-be-projected pattern is stored in the memory of the robot.

Step 108: the initial to-be-projected pattern is gradually magnified according to a preset magnification scale to form a magnified to-be-projected pattern.

It should be appreciated that the preset magnification scale can be set according to specific magnification requirements, and the preset magnification scale may be a fixed value or a variable value. It should be noted that in the embodiment, there exists a magnification boundary when the initial to-be-projected pattern is magnified, that is, after the initial to-be-projected pattern is gradually magnified by a certain number of times (such as three times, four times, or five times), the magnification is stopped.

When the first magnified to-be-projected pattern is magnified based on the initial to-be-projected pattern, and the second magnified to-be-projected pattern is magnified based on the first magnified to-be-projected pattern, the preset magnification scale is a fixed value. For example, the preset magnification scale may be set to 20%, 30%, 40% or 50%. For example, assuming that the preset magnification scale is set to 20%, after the initial to-be-projected pattern is magnified by 20% at the current moment to obtain the first magnified to-be-projected pattern, at the next moment the first magnified to-be-projected pattern obtained by magnifying the initial to-be-projected pattern by 20% is magnified again by 20% to obtain the second magnified to-be-projected pattern.

Further, when the magnified to-be-projected patterns are formed based on the initial to-be-projected pattern, the preset magnification scale is a variable value, for example, the preset magnification scale may be set to 10% (the magnification scale used for the first magnified to-be-projected pattern based on the initial to-be-projected pattern), 15% (the magnification scale used for the second to-be-projected pattern based on the initial to-be-projected pattern), 20% (the magnification scale used for the third magnified to-be-projected pattern based on the initial to-be-projected pattern), and 25% (the magnification scale used for the fourth magnified to-be-projected pattern based on the initial to-be-projected pattern).

Step 109: at least one of the initial to-be-projected pattern and the magnified to-be-projected pattern is displayed in a time sequence.

It should be appreciated that the number of the magnified to-be-projected patterns may be one, two or more. When there exists one magnified to-be-projected pattern, at least one of the initial to-be-projected pattern and the magnified to-be-projected pattern is projected in a time sequence (i.e., displayed sequentially). It is possible to display only the initial to-be-projected pattern or the magnified to-be-projected pattern at one moment; alternatively, the initial to-be-projected pattern and the magnified to-be-projected pattern are displayed at every moment. When there exists two magnified to-be-projected patterns, at least one of the initial to-be-projected pattern and the magnified to-be-projected pattern is displayed in the time sequence. Specifically, it is possible to display only the initial to-be-projected pattern at one moment, and display one of the magnified to-be-projected patterns at the next moment, and display the other magnified to-be-projected pattern at the moment after that, and this sequence is cycled. Alternatively, it is also possible to display the initial to-be-projected pattern at one moment, display the initial to-be-projected pattern and one of the magnified to-be-projected patterns at the next moment, and display the initial to-be-projected pattern and the two magnified to-be-projected patterns at the moment after that, and this sequence is cycled.

There are multiple display modes to display at least one of the initial to-be-projected pattern and the magnified to-be-projected pattern in a time sequence. Several examples of the display modes are listed below, but the present application is not limited to the following embodiments. In the display modes, the pattern is gradually magnified three times as an example for illustration. The to-be-projected pattern after the first magnification can be regarded as the first magnified to-be-projected pattern; the to-be-projected pattern after the second magnification can be regarded as the second magnified to-be-projected pattern; and the to-be-projected pattern after the third magnification can be regarded as the third magnified to-be-projected pattern.

Example I of dynamically displaying a to-be-projected pattern: the initial to-be-projected pattern is displayed at a first moment; the first magnified to-be-projected pattern is displayed at a second moment; the second magnified to-be-projected pattern is displayed at a third moment; the third magnified to-be-projected pattern is displayed a fourth moment; at the fifth moment and subsequent moments, the display processes of the initial to-be-projected pattern or the magnified to-be-projected pattern at the above four moments are sequentially cycled until the to-be-projected pattern is deformed when the robot encounters an obstacle or the direction of movement of the robot changes.

Example II of dynamically displaying the to-be-projected pattern: the display modes are the same as the Example I at the first moment to the fourth moment; the magnified to-be-projected pattern at the fourth moment is still displayed at the fifth and subsequent moments, until the robot encounters an obstacle or the movement direction of the robot changes, the to-be-projected pattern is deformed.

Example III of dynamically displaying the to-be-projected pattern: the initial to-be-projected pattern is displayed at the first moment; the initial to-be-projected pattern and the first magnified to-be-projected pattern are displayed at the second moment; the initial to-be-projected pattern, the first magnified to-be-projected pattern and the second magnified to-be-projected pattern are displayed at the third moment; the initial to-be-projected pattern, the first magnified to-be-projected pattern, the second magnified to-be-projected pattern, and the third magnified to-be-projected pattern are displayed at the fourth moment. The sequence in which the initial to-be-projected pattern and the magnified to-be-projected patterns are displayed is not limited, it is possible to display the initial to-be-projected pattern before the magnified to-be-projected patterns, or to display the magnified to-be-projected patterns before the initial to-be-projected pattern. At the fifth and subsequent moments, the initial to-be-projected pattern or the initial to-be-projected pattern and each magnified to-be-projected pattern displayed at the above-mentioned four moments are sequentially cycled, until the robot encounters an obstacle or the movement direction of the robot changes, the to-be-projected pattern is deformed.

Example IV of dynamically displaying the to-be-projected pattern: the display modes from the first moment to the fourth moment are the same as Example III; the initial to-be-projected pattern and each magnified to-be-projected pattern displayed at the fourth moment are still displayed at the fifth and subsequent moments, until the robot encounters an obstacle or the movement direction of the robot changes, the to-be-projected pattern is deformed.

Step 106: it is detected whether there exists an overlap region between the to-be-projected pattern and the obstacle region, when there exists the overlap region between the to-be-projected pattern and the obstacle region, the to-be-projected pattern is adjusted according to the overlap region, so that there is no overlap region between the to-be-projected pattern and the obstacle region.

Understandably, it is pointed out in the above description that the to-be-projected pattern may include the initial to-be-projected pattern and the magnified to-be-projected pattern. Therefore, when the projected initial to-be-projected pattern or magnified to-be-projected pattern overlaps with the obstacle region, it is determined that there exists the overlap region between the to-be-projected pattern and the obstacle region.

For example, when the distance between the robot and the obstacle region is larger, there may be no overlap region between the initial to-be-projected pattern and the obstacle region, but the magnified initial to-be-projected pattern, that is, the magnified to-be-projected pattern may have an overlap region with the obstacle region. For example, when the magnified to-be-projected pattern intersects with the obstacle region, the intersection region is the overlap region. When the distance between the robot and the obstacle region is smaller, there may exist an overlap region between the initial to-be-projected pattern and the obstacle region. Therefore, in the embodiment, when it is detected that there exists an overlap region between the initial to-be-projected pattern or the magnified to-be-projected pattern and the obstacle region, it is determined that there is an overlap region between the to-be-projected pattern and the obstacle region.

Figure 18:
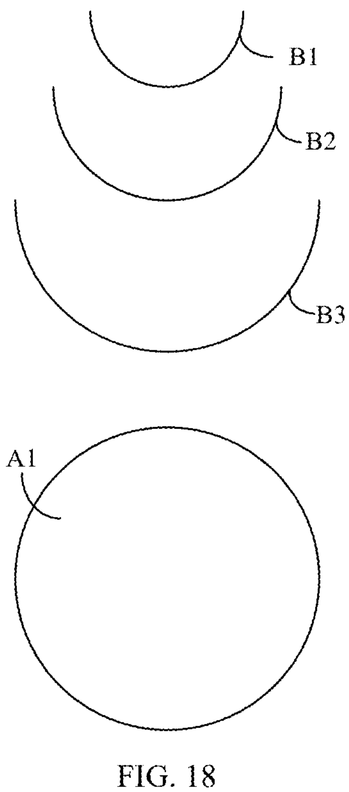
FIG. 18 is a schematic diagram illustrating a case where there is no overlap region between a to-be-projected pattern and an obstacle region according to an embodiment of the present disclosure.

For example, as shown in FIG. 18, B1 is the initial to-be-projected pattern, B2 is the first magnified to-be-projected pattern, B3 is the second magnified to-be-projected pattern. At the moment, there is no overlap region between the initial to-be-projected pattern and the obstacle region, and between the magnified to-be-projected pattern and the obstacle region, so that it can be determined that there is no overlap region between the to-be-projected pattern and the obstacle region.

In some embodiments, the initial to-be projected pattern may specifically be an initial indicator pattern; the magnified to-be-projected pattern may specifically be an magnified indicator pattern.

It should be appreciated that in the above description, the obstacle region is mapped into the preset projection pattern. Furthermore, when the to-be-projected pattern that needs to be projected in real time during the movement of the robot is also mapped into the preset projection pattern, the real-time position in which the robot is currently located can be mapped into the preset projection pattern, and the position information of the obstacle region is also mapped into the preset projection pattern, so that it is possible to simulate in the preset projection pattern that whether there exists the overlap region between the to-be-projected pattern projected by the robot at the current real-time position and the obstacle region. The current real-time position of the robot and the real position of the obstacle region can be displayed in the preset projection pattern. Alternatively, the current real-time position of the robot and the real position of the obstacle region can also be mapped according to a certain scale before being displayed in the preset projection pattern, which is no limited here.

It should be appreciated that when there exists the overlap region between the to-be-projected pattern and the obstacle region, in the embodiment, the to-be-projected pattern needs to be adjusted according to the overlap region, so that there is no overlap region between the to-be-projected pattern and the obstacle region, in order to implement the interaction between the robot and pedestrians.

In an embodiment, the step of adjusting the to-be-projected pattern according to the overlap region in the step 106 may include:

two curve intersection points of an overlap to-be-projected pattern and the obstacle region in the overlap region are determined, i.e., intersection points of a curve of the overlap to-be-projected pattern and a curve of the obstacle region, in which the overlap to-be-projected pattern refers to the initial to-be-projected pattern or the magnified to-be-projected pattern. The curve is a general term for straight and non-straight lines. For example, the non-straight line may be a wavy line, a curved line, etc. The initial to-be-projected pattern may consist of straight line segments, or non-straight line segments, or a combination of straight line segments and non-straight line segments.

It should be appreciated that in some embodiments, the overlap to-be-projected pattern may be specifically an overlap indicator pattern. It is pointed out in the above description that the obstacle region in the present application is a circular obstacle region, that is, a circular region with a minimum area that includes all obstacle information (such as A1 in FIG. 19). Furthermore, when there exists an overlap region between the overlap to-be-projected pattern (such as L5 in FIG. 19) and the obstacle region, two curve intersection points between the overlap to-be-projected pattern and the obstacle region are determined in the overlap region (such as a curve intersection point 1, and another curve intersection point 2 in the FIG. 19), that is, two intersection points between the boundary of the overlap to-be-projected pattern and the boundary of the circular obstacle region.

The line segments between the two curve intersection points in the overlap to-be-projected pattern are removed, and two remaining curve segments in the overlap to-be-projected pattern after the removing are obtained.

It should be appreciated that it is pointed out in the above description that the to-be-projected pattern consists of a preset number of curve nodes. Therefore, after the two curve intersection points between the overlap to-be-projected pattern and the obstacle region are determined in the overlap region, the line segments between the two curve intersection points in the overlap to-be-projected pattern are removed (such as the dotted line segments located inside the obstacle region A1 and in the overlap to-be-projected pattern L5 in FIG. 19), that is, all the curve nodes between the two curve intersection points and in the overlap to-be-projected pattern (such as all nodes on the dotted line segments located inside the obstacle region A1 in the overlap to-be-projected pattern L5 shown in FIG. 19) are removed, and then a remaining curve segment with one of the two curve intersection points as an end point (such as L1 in FIG. 19) and another remaining curve segment with the other curve intersection point as a beginning endpoint (such as L2 in FIG. 19) are obtained.

A mid-perpendicular intersection point corresponding to a connecting line between the two curve intersection points is determined.

Figure 19:
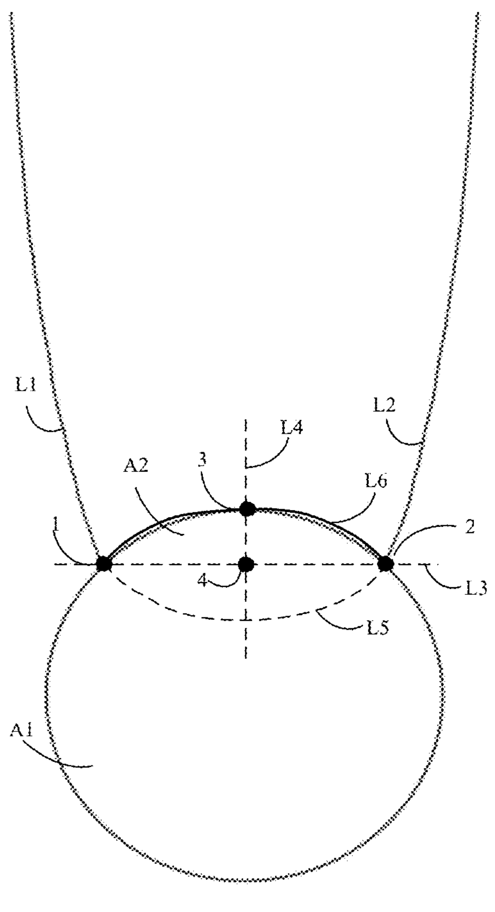
FIG. 19 is a schematic diagram illustrating a case where there exists an overlap region between a to-be-projected pattern and an obstacle region according to an embodiment of the present disclosure.

For example, L3 in FIG. 19 is the connecting line between the two curve intersection points, that is, a line segment between the two curve intersection points. As shown in FIG. 19, L4 is the mid-perpendicular line corresponding to the connecting line between the two curve intersection points. The mid-perpendicular intersection point (such as the intersection point 4 in FIG. 19) is an intersection point of the connecting line between the two curve intersection points and the mid-perpendicular line corresponding to the connecting line.

A vertical distance between the mid-perpendicular intersection point and a boundary intersection point is detected, and the vertical distance is compared to a preset distance threshold value; the boundary intersection point refers to an intersection point of the mid-perpendicular and an edge of the obstacle region, and the boundary intersection point is located within the curve overlap region.

The boundary intersection point (indicated as 3 in FIG. 19) refers to the intersection point of the mid-perpendicular and the edge of the obstacle region; and the boundary intersection point is located in the overlap region (indicated as A2 in FIG. 19). The preset distance threshold value can be set according to the visual effect of the to-be-projected pattern projected by the robot in real time. For example, the preset distance threshold value may be set to a radius of the obstacle region (it is pointed out in the above description that the obstacle region in the present application is a circular region).

When the vertical distance is less than or equal to the preset distance threshold value, the to-be-projected pattern is adjusted according to the two remaining curve segments, the curve intersection points, and the boundary intersection point.

Specifically, after the vertical distance is compared to the preset distance threshold value, when the vertical distance is less than or equal to the preset distance threshold value, the two remaining curve segments are connected to each other through the two curve intersection points and the boundary intersection point; and the two curve intersection points and the boundary intersection point are also connected to each other through curve segments to form a curve (the radian of the curve can be determined according to the obstacle region, that is, the two curve intersection points and the boundary intersection point are also connected to each other through curve segments to form a curve accordingly which does not overlap with the obstacle region), and then the adjusted to-be-projected pattern (indicated as L6 in FIG. 19) is obtained. When the vertical distance is greater than the preset distance threshold value, the projection of the to-be-projected pattern is stopped.

In another embodiment, the step of adjusting the to-be-projected pattern according to the overlap region in the step 106 may include: the initial to-be-projected pattern or the magnified to-be-projected pattern having the overlap region with the obstacle region is recorded as the overlap to-be-projected pattern; the overlap to-be-projected pattern may include an overlap region overlapping the obstacle region and a remaining region which does not overlap with the obstacle region;

the overlap region of the overlap to-be-projected pattern is removed, or the overlap to-be-projected pattern is reduced according to a preset scale to allow the overlap to-be-projected pattern to be tangent to the edge of the obstacle region, to obtain the adjusted to-be-projected pattern.

In an embodiment, the overlap region of the overlap to-be-projected pattern is removed to obtain the adjusted to-be-projected pattern. For example, as for the to-be-projected pattern, only the initial to-be-projected pattern is displayed at the first moment, only the first magnified to-be-projected pattern is displayed at the second moment, the second magnified to-be-projected pattern is displayed at the third moment, and the second magnified to-be-projected pattern is still displayed at the fourth and subsequent moments. When an obstacle is encountered, the second magnified to-be-projected pattern is the overlap to-be-projected pattern, the overlap region in the second magnified to-be-projected pattern is removed to obtain the adjusted to-be-projected pattern, and the adjusted to-be-projected pattern is displayed at subsequent moments.

In an embodiment, the overlap to-be-projected pattern is reduced according to a preset scale to allow the overlap to-be-projected pattern to be tangent to the edge of the obstacle region, to obtain the adjusted to-be-projected pattern. For example, as for the to-be-projected pattern, only the initial to-be-projected pattern is displayed at the first moment, only the first magnified to-be-projected pattern is displayed at the second moment, the second magnified to-be-projected pattern is displayed at the third moment, and the above display sequence is cycled at subsequent moments. When an obstacle is encountered, the second magnified to-be-projected pattern, the first magnified to-be-projected pattern, or the initial to-be-projected pattern may all become overlap to-be-projected patterns, and the overlap to-be-projected patterns are reduced according to a preset scale so that the overlap to-be-projected patterns are tangent to the edge of the obstacle region. The preset scale for of the reduction is a variable, that is, the preset scales of the reduction corresponding to the overlap to-be-projected patterns at different moments are different. The preset scale is calculated based on a degree of overlap between the overlap to-be-projected pattern and the obstacle region.

Figure 20:
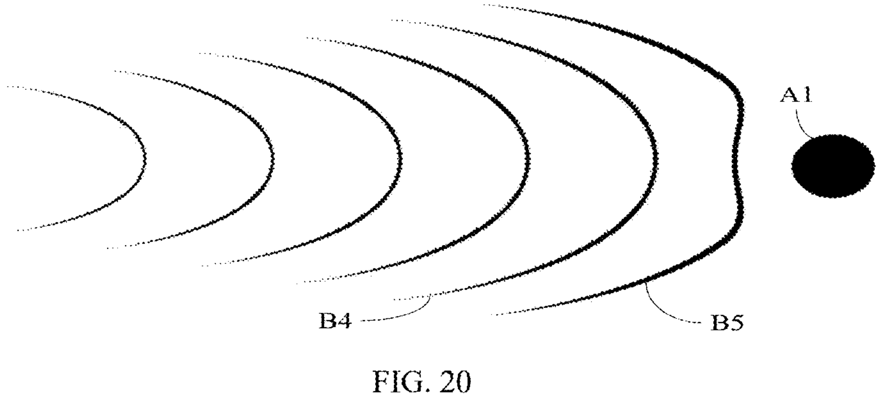
FIG. 20 is a schematic diagram illustrating a case where there exists an overlap region between a mobile robot and an obstacle region during a movement according to an embodiment of the present disclosure.

In an embodiment, as shown in FIG. 20 which is a schematic diagram showing that the mobile robot has an overlap region with an obstacle region during the movement. The obstacle region A1 is in front of the robot in the traveling direction of the robot. In the above description, it is pointed out that the to-be-projected pattern projected by the robot in real time during the operation of the robot may include the initial to-be-projected pattern and the magnified to-be-projected patterns obtained by gradually magnifying the initial to-be-projected pattern. The initial to-be-projected pattern and the magnified to-be-projected patterns may be dynamically displayed during the operation. As long as there exists an overlap region between the initial to-be-projected pattern or any one of the magnified to-be-projected patterns and the obstacle region, it is determined that there exists the overlap region between the to-be-projected pattern projected by the robot in real time and the obstacle region. Accordingly, as shown in FIG. 20, in the to-be-projected patterns projected by the robot, none of the magnified to-be-projected pattern B4 and other magnified to-be-projected patterns projected before the magnified to-be-projected pattern B4 or the initial to-be-projected pattern has the overlap region with the obstacle region A1; the magnified to-be-projected pattern B5 after the magnified to-be-projected pattern B4 has an overlap region with the obstacle region A1. Accordingly, it can be determined that there exists an overlap region between the to-be-projected patterns projected by the robot in real time during the operation and the obstacle region. Therefore, the magnified to-be-projected pattern B5 is adjusted according to the overlap region between the magnified to-be-projected pattern B5 and the obstacle region A1, so that there is no overlap region between the adjusted magnified to-be-projected pattern B5 and the obstacle region A1.

In an embodiment, after the step 106 of adjusting the to-be-projected pattern according to the overlap region, the processor may further implement the following steps when executing the computer-readable instructions.

Current position information of the robot is acquired, and the position distance between the robot and the obstacle region is determined based on the current position information.

Understandably, the current position information refers to information of a real-time position where the robot is currently located. Further, after the current position information of the robot is acquired in real time, the position distance between the robot and the obstacle region is determined based on the current position information.

A color parameter of the adjusted to-be-projected pattern is determined according to the position distance, and the adjusted to-be-projected pattern is projected according to the color parameter of the curve.

It should be appreciated that the color parameter may include a type of a color, a depth of a color, etc. When the distance between the robot and the obstacle is farther, the to-be-projected pattern can be displayed in a light color. As the distance between the robot and the obstacle gradually shortens, the color of the to-be-projected pattern gradually becomes darker. For example, when the robot is far away from the obstacle region (such as 1 km away from the obstacle region), the color parameter can be selected as a light blue of a laser beam with a lighter depth. When the robot is adjacent to the obstacle region (such as 100 m away from the obstacle region), the color parameter can be selected as a deep red of a laser beam with a deeper depth.

Specifically, after the current position information of the robot is obtained and the position distance between the robot and the obstacle region is determined according to the current position information, the color parameter of the adjusted to-be-projected pattern is determined according to the position distance, and the adjusted to-be-projected pattern is projected according to the color parameter, that is, the adjusted to-be-projected pattern is projected onto the ground to implement the interaction with pedestrians.

In the embodiment, the curve overlap region between the to-be-projected pattern and the obstacle region is determined, the to-be-projected pattern is adjusted according to the curve overlap region, so that the to-be-projected pattern emitted by the robot may dynamically deform according to different obstacle regions; moreover, the adjusted to-be-projected pattern does not overlap with the obstacle region, thereby implementing the information interaction between the robot and the obstacle, and improving the efficiency and accuracy of the information interaction between the robot and the pedestrians.

In an embodiment, when the initial to-be-projected pattern or the magnified to-be-projected pattern overlaps with the obstacle region, and after it is determined that there exists an overlap region between the to-be-projected pattern and the obstacle region, the processor may further implement the following steps when executing the computer-readable instructions.

When there exists the overlap region between the initial to-be-projected pattern or the magnified to-be-projected pattern and the obstacle region, overlap position information of the robot is acquired, and the position distance between the robot and the obstacle region is determined according to the overlap position information.

The overlap region is updated according to the position distance.

It should be appreciated that the overlap position information refers to the information of the real-time position where the robot is currently located when the initial to-be-projected pattern or the magnified to-be-projected pattern overlaps with the obstacle region. Furthermore, it is pointed out in the above description that the to-be-projected patterns projected by the robot in real time are obtained by gradually magnifying the initial to-be-projected pattern, that is, the to-be-projected pattern projected by the robot in real time may include the initial to-be-projected pattern and the magnified to-be-projected pattern, and the projections are real-time and cycled. A certain interval exists between the to-be-projected patterns (may include the initial to-be-projected pattern and the magnified to-be-projected pattern, or different magnified to-be-projected patterns), so that different positions of the robot may cause different overlap portion existing between each of the to-be-projected patterns projected by the robot and the obstacle region, accordingly the overlap region need to be updated at different positions.

Furthermore, when the initial to-be-projected pattern or the magnified to-be-projected pattern overlaps with the obstacle region, the current position of the robot (that is, the overlap position information) is acquired, and the position distance between the robot and the obstacle region is determined according to the overlap position information. The robot may have different overlap regions with the obstacle region at different positions. For example, for the same to-be-projected pattern (the initial to-be-projected pattern or the magnified to-be-projected pattern), as the position distance between the robot and the obstacle region becomes smaller, the overlap region between the to-be-projected pattern and the obstacle region may become larger, so that the overlap region can be updated in real time, and the to-be-projected pattern can be adjusted according to the updated overlap region, which allows more flexible and more accurate interaction between the robot and the pedestrians.

In an embodiment, when the initial to-be-projected pattern or the magnified to-be-projected pattern overlaps with the obstacle region, and after it is determined that there exists the overlap region between the to-be-projected pattern and the obstacle region, the processor may further implement the following steps when executing the computer-readable instructions.

A magnification factor of the magnified to-be-projected pattern having an overlap region with the obstacle region is acquired.

A region size of the overlap region is determined according to the magnification factor.

It should be appreciated that the magnification factor refers to a magnification factor of the magnified to-be-projected pattern with respect to the initial to-be-projected pattern. For example, assuming that the preset magnification scale is 20%, the first magnified to-be-projected pattern is obtained by magnifying the initial to-be-projected pattern by 20%, and the second magnified to-be-projected pattern is obtained by magnifying the initial to-be-projected pattern by 40%. However, the magnification factor is different, the overlap region between the corresponding magnified to-be-projected pattern and the obstacle region is different. Accordingly, in the embodiment, the region size of the overlap region can be determined according to the magnification factor, and then the region size of the overlap region can be adjusted according to the magnification factor when there exists the overlap region between the different to-be-projected pattern (such as the initial to-be-projected pattern or the magnified to-be-projected pattern) and the obstacle region, and the overlap region can be updated in real time, so that the to-be-projected pattern is adjusted according to the updated overlap region, which allows more flexible and accurate interaction between the robot and the pedestrians.

In an embodiment, a computer-readable storage medium is provided, on which a computer program is stored. When the computer program is executed by a processor, the steps in the above method embodiments are implemented.

Those of ordinary skill in the art can understand that all or part of the processes in the methods of the above embodiments can be completed by instructing relevant hardware through a computer program. The computer program can be stored in a non-transitory computer-readable storage. When executed, the computer program may implement the processes of the above method embodiments. Any reference to memory, storage, database or other media used in the embodiments provided in the present application may include at least one of non-transitory and transitory memory. The non-transitory memory may include read-only memory (ROM), magnetic tape, floppy disk, flash memory or optical memory, etc. The transitory memory may include Random Access Memory (RAM) or external cache memory. By way of illustration but not limitation, the RAM can be in various forms, such as Static Random Access Memory (SRAM) or Dynamic Random Access Memory (DRAM), etc.

The technical features of the above embodiments can be combined in any way. To simplify the description, not all possible combinations of the technical features in the above embodiments are described. However, as long as there is no contradiction in the combination of these technical features, all possible combinations should be regarded as being within the scope of the present application.

The above-described embodiments only express several implementation modes of the present application, and the descriptions are relatively specific and detailed, but should not be construed as limiting the scope of the present application. It should be noted that, those of ordinary skill in the art can make several modifications and improvements without departing from the concept of the present application, and these all fall within the protection scope of the present application. Therefore, the protection scope of the present application should be subject to the appended claims.

What is claimed is:

1. An interaction method for a mobile robot, the mobile robot being provided with a projection device and an environmental perception sensor, the method comprising:

acquiring map data information of a space where the mobile robot is located and real-time environmental perception data collected by the environmental perception sensor, wherein the real-time environmental perception data comprises real-time obstacle information and real-time indication information for indicating a road condition around the mobile robot;

acquiring target traveling path information of the mobile robot based on the real-time obstacle information and the map data information, and determining a ground projection region according to the target traveling path information and the real-time indication information;

acquiring a to-be-projected pattern, and determining a projection parameter corresponding to the to-be-projected pattern according to the to-be-projected pattern and the ground projection region, wherein the to-be-projected pattern is configured to indicate a traveling intention of the mobile robot;

controlling the projection device according to the projection parameter to project the to-be-projected pattern onto the ground projection region;

projecting the to-be-projected pattern in real time during an operating process, and acquiring an obstacle region existing on the road surface during the operating process; and detecting whether there exists an overlap region between the to-be-projected pattern and the obstacle region, adjusting the to-be-projected pattern according to the overlap region when there exists the overlap region between the to-be-projected pattern and the obstacle region, such that there is no overlap region between the to-be-projected pattern and the obstacle region;

wherein the acquiring the obstacle region existing on the road surface during the operating process comprises:

collecting obstacle information in real time during the operating process, and mapping pixel information corresponding to the obstacle information into a preset projection pattern;

determining a region with a minimum area comprising all the pixel information from the projection region, and recording the region with the minimum area as the obstacle region;

wherein the to-be-projected pattern comprises at least one of an initial to-be-projected pattern and the magnified to-be-projected pattern, the magnified to-be-projected pattern is obtained by magnifying the initial to-be-projected pattern according to a preset magnification scale, the projecting the to-be-projected pattern in real time during the operating process comprises:

projecting the at least one of the initial to-be-projected pattern and the magnified to-be-projected pattern in the operating process;

wherein the adjusting the to-be-projected pattern according to the overlap region comprises:

determining two curve intersection points of an overlap to-be-projected pattern and the obstacle region in the overlap region, wherein the overlap to-be-projected pattern refers to the initial to-be-projected pattern or the magnified to-be-projected pattern;

removing a line segment between the two curve intersection points in the overlap to-be-projected pattern, and obtaining two remaining curve segments in the overlap to-be-projected pattern after the removing of the line segment;

determining a mid-perpendicular intersection point corresponding to a connecting line between the two curve intersection points;

detecting a vertical distance between the mid-perpendicular intersection point and a boundary intersection point, and comparing the vertical distance to a preset distance threshold value, wherein the boundary intersection point refers to an intersection point of the mid-perpendicular and an edge of the obstacle region, and the boundary intersection point is located within the curve overlap region;

when the vertical distance is less than or equal to the preset distance threshold value, adjusting the to-be-projected pattern according to the two remaining curve segments, the curve intersection points, and the boundary intersection point, to obtain the adjusted to-be-projected pattern, wherein there is no overlap region between the adjusted to-be-projected pattern and the obstacle region.

2. The interaction method according to claim 1, further comprising:

before acquiring the map data information of the space where the mobile robot is located and the real-time environmental perception data collected by the environmental perception sensor, acquiring historical environmental perception data collected by the environmental perception sensor when an environment of the space where the mobile robot is located satisfies a preset environmental condition;

determining spatial coordinate information of the space where the mobile robot is located according to the historical environmental perception data, and creating a map of the space according to the spatial coordinate information;

determining data information of the map as the map data information.

3. The interaction method according to claim 2, wherein the environmental perception sensor comprises a radar device and a camera device, and the acquiring the real-time environmental perception data collected by the environmental perception sensor comprises:

acquiring real-time distance information between an obstacle and the mobile robot collected by the radar device;

acquiring real-time obstacle identification information, road surface shape information of the road surface around the mobile robot, and real-time obstacle distribution information of the road surface around the mobile robot collected by the camera device;

determining the real-time obstacle identification information and the real-time distance information as the real-time obstacle information, and determining the road surface shape information and the real-time obstacle distribution information as the real-time indication information.

4. The interaction method according to claim 1, wherein the acquiring the target traveling path information of the mobile robot based on the real-time obstacle information and the map data information comprises:

determining a real-time position of the mobile robot and a position of the obstacle according to the map data information and the real-time obstacle information;

acquiring a target final position of the mobile robot, determining shortest path information from the real-time position to the target final position based on the real-time position and the position of the obstacle, and determining the shortest path information as the target traveling path information of the mobile robot.

5. The interaction method according to claim 1, wherein the determining the projection parameter corresponding to the to-be-projected pattern according to the to-be-projected pattern and the ground projection region comprises:

for each pixel point in the to-be-projected pattern, determining a projection angle, projection time, and a projection color corresponding to each pixel point according to the ground projection region;

determining the projection angle, the projection time, and the projection color corresponding to each pixel point as projection parameters of the to-be-projected pattern.

6. The interaction method according to claim 5, wherein the projection device comprises a galvanometer, a visible laser, and a lens, and the controlling the projection device according to the projection parameters to project the to-be-projected pattern onto the ground projection region comprises:

determining a rotation angle of the galvanometer corresponding to each pixel point according to the projection angle corresponding to each pixel point, determining laser emission information of the visible laser and laser synthesis information of the lens corresponding to each pixel point according to the projection color corresponding to each pixel point;

determining a projection sequence of each pixel point according to the projection time corresponding to each pixel point;

in accordance with the projection sequence of each pixel point, adjusting the projection device according to the rotation angle of the galvanometer, the laser emission information, and the laser synthesis information of the lens corresponding to each pixel point, to project the to-be-projected pattern onto the ground projection region.

7. The interaction method according to claim 1, further comprising:

before determining the ground projection region according to the target traveling path information and the real-time indication information, determining whether a preset projection condition is satisfied according to the target traveling path information and the real-time environmental perception data;

wherein, correspondingly, the determining the ground projection region according to the target traveling path information comprises:

when a determination result indicates that the preset projection condition is satisfied, determining the ground projection region according to the target traveling path information;

wherein the preset projection condition comprises at least one of:

a traveling direction of the mobile robot changes within a preset time period in the future, a traveling state of the mobile robot is a paused state, there exists a pedestrian around the mobile robot, or the mobile robot is currently in an operating state.

8. The interaction method according to claim 7, wherein when the preset projection condition is that the mobile robot is currently in the operating state, the acquiring the to-be-projected pattern comprises:

determining whether the pattern currently projected by the mobile robot is capable of reflecting the traveling intention of the mobile robot according to the target traveling path information;

when the pattern currently projected by the mobile robot is capable of reflecting the traveling intention of the mobile robot, determining the pattern currently projected by the mobile robot as the to-be-projected pattern;

when the pattern currently projected by the mobile robot is incapable of reflecting the traveling intention of the mobile robot, generating the to-be-projected pattern according to the traveling intention of the mobile robot;

wherein the determining whether the pattern currently projected by the mobile robot is capable of reflecting the traveling intention of the mobile robot according to the target traveling path information comprises:

when the real-time obstacle information indicates that the obstacle around the mobile robot is a movable obstacle, determining whether the pattern currently projected by the mobile robot is capable of reflecting the traveling intention of the mobile robot according to the target traveling path information.

9. The interaction method according to claim 1, wherein the to-be-projected pattern comprises an initial to-be-projected pattern and different magnified to-be-projected patterns generated at different moments and at different magnification scales, and the projecting the to-be-projected pattern in real time during the operating process comprises:

projecting the initial to-be-projected pattern, and arranging and projecting the magnified to-be-projected patterns generated and the initial to-be-projected pattern at different moments.

10. The interaction method according to claim 1, wherein the adjusting the to-be-projected pattern according to the overlap region comprises:

recording the initial to-be-projected pattern or the magnified to-be-projected pattern having the overlap region with the obstacle region as the overlap to-be-projected pattern, wherein the overlap to-be-projected pattern comprises the overlap region overlapping with the obstacle region and a remaining region which does not overlap with the obstacle region;

removing the overlap region of the overlap to-be-projected pattern, or reducing the overlap to-be-projected pattern according to a preset scale to allow the overlap to-be-projected pattern to be tangent to the edge of the obstacle region, to obtain the adjusted to-be-projected pattern.

11. The interaction method according to claim 1, wherein the adjusting the to-be-projected pattern according to the two remaining curve segments, the curve intersection points, and the boundary intersection point to obtain the adjusted to-be-projected pattern comprises:

connecting the two curve intersection points to the boundary intersection point through a preset connection mode to obtain a connecting line segment;

recording the to-be-projected pattern formed by connecting the two remaining curve segments with the connecting line segment as the adjusted to-be-projected pattern.

12. The interaction method according to claim 1, further comprising:

after comparing the vertical distance to the preset distance threshold value, stopping the projection of the to-be-projected pattern when the vertical distance is greater than the preset distance threshold value.

13. The interaction method according to claim 1, further comprising:

after adjusting the to-be-projected pattern according to the overlap region, acquiring current position information of the robot, and determine a position distance between the robot and the obstacle region according to the current position information;

determining a color parameter of the adjusted to-be-projected pattern according to the position distance, and project the adjusted to-be-projected pattern according to the color parameter.

14. A mobile robot, comprising a projection device, an environmental perception sensor, and a processor, wherein the environmental perception sensor is configured to collect real-time environmental perception data, the real-time environmental perception data comprises real-time obstacle information and real-time indication information indicating a road condition around the mobile robot;

the processor is configured to acquire map data information of a space where the mobile robot is located and the real-time environmental perception data, acquire target traveling path information of the mobile robot based on the real-time obstacle information and the map data information, determine a ground projection region according to the target traveling path information and the real-time indication information, acquire a to-be-projected pattern, and determine a projection parameter corresponding to the to-be-projected pattern according to the to-be-projected pattern and the ground projection region, the to-be-projected pattern being configured to indicate a traveling intention of the mobile robot, and control the projection device according to the projection parameter to project the to-be-projected pattern onto the ground projection region;

the processor is further configured to project the to-be-projected pattern in real time during an operating process, acquire an obstacle region existing on the road surface during the operating process, detect whether there exists an overlap region between the to-be-projected pattern and the obstacle region, and adjust the to-be-projected pattern according to the overlap region when there exists the overlap region between the to-be-projected pattern and the obstacle region, such that there is no overlap region between the to-be-projected pattern and the obstacle region;

the processor is further configured to:

collect obstacle information in real time during the operating process, and map pixel information corresponding to the obstacle information into a preset projection pattern;

determine a region with a minimum area comprising all the pixel information from the projection region, and record the region with the minimum area as the obstacle region;

wherein the to-be-projected pattern comprises at least one of an initial to-be-projected pattern and the magnified to-be-projected pattern, the magnified to-be-projected pattern is obtained by magnifying the initial to-be-projected pattern according to a preset magnification scale, and the processor is further configured to:

project the at least one of the initial to-be-projected pattern and the magnified to-be-projected pattern in the operating process;

determine two curve intersection points of an overlap to-be-projected pattern and the obstacle region in the overlap region, wherein the overlap to-be-projected pattern refers to the initial to-be-projected pattern or the magnified to-be-projected pattern;

remove a line segment between the two curve intersection points in the overlap to-be-projected pattern, and obtain two remaining curve segments in the overlap to-be-projected pattern after the removing of the line segment;

determine a mid-perpendicular intersection point corresponding to a connecting line between the two curve intersection points;

detect a vertical distance between the mid-perpendicular intersection point and a boundary intersection point, and compare the vertical distance to a preset distance threshold value, wherein the boundary intersection point refers to an intersection point of the mid-perpendicular and an edge of the obstacle region, and the boundary intersection point is located within the curve overlap region;

when the vertical distance is less than or equal to the preset distance threshold value, adjust the to-be-projected pattern according to the two remaining curve segments, the curve intersection points, and the boundary intersection point, to obtain the adjusted to-be-projected pattern, wherein there is no overlap region between the adjusted to-be-projected pattern and the obstacle region; and the projection device is configured to project the to-be-projected pattern onto the ground projection region.

15. The mobile robot according to claim 14, wherein the processor is further configured to:

determine whether a preset projection condition is satisfied according to the target traveling path information and the real-time environmental perception data, wherein the preset projection condition at least comprises one of: a traveling direction of the mobile robot changes within the preset time period in the future, a traveling state of the mobile robot is a paused state, there exists a pedestrian around the mobile robot, and the mobile robot is currently in an operating state;

determine the ground projection region according to the target traveling path information when a determination result indicates that the preset projection condition is satisfied.

16. The mobile robot according to claim 15, wherein the processor is further configured to:

determine whether a pattern currently projected by the mobile robot is capable of reflecting the traveling intention of the mobile robot according to the target traveling path information when the preset projection condition is that the mobile robot is currently in the operating state;

determine the pattern currently projected by the mobile robot as the to-be-projected pattern when the pattern currently projected by the mobile robot is capable of reflecting the traveling intention of the mobile robot;

generate the to-be-projected pattern according to the traveling intention of the mobile robot when the pattern currently projected by the mobile robot is incapable of reflecting the traveling intention of the mobile robot.

17. A computer-readable storage medium, on which a computer program is stored, wherein the computer program, when executed by a processor, causes the processor to implement the steps of the interaction method of claim 1.

* * * * *